United States Patent
Di et al.

(10) Patent No.: US 12,444,227 B2
(45) Date of Patent: Oct. 14, 2025

(54) FINGERPRINT RECOGNITION METHOD AND APPARATUS

(71) Applicant: Honor Device Co., Ltd., Shenzhen (CN)

(72) Inventors: Haoxuan Di, Shenzhen (CN); Danhong Li, Shenzhen (CN); Junlong Guo, Shenzhen (CN); Mingjin Guo, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/837,020

(22) PCT Filed: May 5, 2023

(86) PCT No.: PCT/CN2023/092270
§ 371 (c)(1),
(2) Date: Aug. 8, 2024

(87) PCT Pub. No.: WO2024/037054
PCT Pub. Date: Feb. 22, 2024

(65) Prior Publication Data
US 2025/0157249 A1    May 15, 2025

(30) Foreign Application Priority Data
Aug. 18, 2022  (CN) ................. 202210994179.1

(51) Int. Cl.
*G06V 40/13* (2022.01)
*G06V 40/12* (2022.01)

(52) U.S. Cl.
CPC ...... *G06V 40/1335* (2022.01); *G06V 40/1347* (2022.01)

(58) Field of Classification Search
CPC .................................................. G06V 40/13
See application file for complete search history.

(56) References Cited

U.S. PATENT DOCUMENTS

| | | | |
|---|---|---|---|
| 10,924,128 B2 | 2/2021 | Shibata et al. | |
| 2019/0050620 A1* | 2/2019 | Andersson | ......... G06V 40/1306 |

(Continued)

FOREIGN PATENT DOCUMENTS

| | | |
|---|---|---|
| CN | 1506903 A | 6/2004 |
| CN | 108051930 A | 5/2018 |

(Continued)

*Primary Examiner* — Joseph R Haley
(74) *Attorney, Agent, or Firm* — Slater Matsil, LLP

(57) ABSTRACT

A fingerprint recognition method and apparatus are applied to the field of fingerprint recognition technologies. The method includes: collecting a to-be-enrolled fingerprint image; performing, based on a first calibration image, calibration processing on the to-be-enrolled fingerprint image to obtain a first fingerprint image; and determining whether an adaptive calibration image exists; and updating the first calibration image based on the first fingerprint image and a first update coefficient when the adaptive calibration image exists, to obtain a second calibration image; or generating a third calibration image based on the first fingerprint image when no adaptive calibration image exists. The third calibration image is an image obtained by performing summation and averaging on a plurality of frames of fingerprint images, or the third calibration image is an image obtained by updating the first calibration image based on the first fingerprint image.

20 Claims, 9 Drawing Sheets

(56) References Cited

U.S. PATENT DOCUMENTS

| | | | |
|---|---|---|---|
| 2020/0143135 A1* | 5/2020 | Kim | G06V 40/1318 |
| 2020/0410206 A1* | 12/2020 | Reynolds | G06V 10/98 |
| 2021/0326567 A1 | 10/2021 | Liu et al. | |
| 2022/0067330 A1 | 3/2022 | Zhan et al. | |

FOREIGN PATENT DOCUMENTS

| | | | |
|---|---|---|---|
| CN | 109889983 A | 6/2019 | |
| CN | 109901754 A | 6/2019 | |
| CN | 109948491 A | 6/2019 | |
| CN | 110188679 A | 8/2019 | |
| CN | 110189367 A | 8/2019 | |
| CN | 110192201 A | 8/2019 | |
| CN | 110287908 A | 9/2019 | |
| CN | 110856112 A | 2/2020 | |
| CN | 111988038 A | 11/2020 | |
| CN | 112132125 A | 12/2020 | |
| CN | 112990163 A | 6/2021 | |
| CN | 113495613 A | 10/2021 | |
| CN | 114463791 A | 5/2022 | |

* cited by examiner

FINGERPRINT RECOGNITION METHOD AND APPARATUS

CROSS-REFERENCE TO RELATED APPLICATIONS

This application is a national stage of International Application No. PCT/CN2023/092270, filed on May 5, 2023, which claims priority to Chinese Patent Application No. 202210994179.1, filed on Aug. 18, 2022. The disclosures of both of the aforementioned applications are hereby incorporated by reference in their entireties.

TECHNICAL FIELD

This application relates to the field of biometric recognition, and specifically, to a fingerprint recognition method and apparatus.

BACKGROUND

With popularization of intelligent terminals, fingerprint recognition technologies also develop rapidly in the terminal field. Especially in a scenario where a user wears a mask, compared with face unlocking, fingerprint unlocking is of indispensable importance. For an optical fingerprint, a fingerprint unlocking device and a fingerprint collection area, an optical fingerprint component and a screen of a terminal are separated from each other, and may be bonded together to implement a function related to fingerprint recognition. When the terminal is produced in a production line, a fingerprint calibration image is usually preset in the terminal. The fingerprint calibration image can fit noise of the screen of the terminal and the fingerprint component, and calibrate a fingerprint image collected by the fingerprint component, so as to eliminate interference noise of the fingerprint image. However, as an external environment changes, an effect of the fingerprint calibration image becomes worse. As a result, a calibration effect of the fingerprint image affects unlocking experience of the user.

SUMMARY

In view of this, this application provides a fingerprint recognition method and apparatus, a computer-readable storage medium, and a computer program product, to adaptively update a calibration image of an electronic device, thereby improving a degree of adaptation between the calibration image and a current environment, helping better calibrate a collected fingerprint image, and improving unlocking experience of a user.

According to a first aspect, a fingerprint recognition method is provided. The method is applied to an electronic device, and the method includes:

collecting a to-be-enrolled fingerprint image;

performing, based on a first calibration image, calibration processing on the to-be-enrolled fingerprint image to obtain a first fingerprint image; and determining whether an adaptive calibration image exists in the electronic device; and updating the first calibration image based on the first fingerprint image and a first update coefficient when the adaptive calibration image exists in the electronic device, to obtain a second calibration image, where the first calibration image is the adaptive calibration image, and the second calibration image is used to perform calibration processing on the collected fingerprint image; or generating a third calibration image based on the first fingerprint image when no adaptive calibration image exists in the electronic device, where the third calibration image is used to perform calibration processing on the collected fingerprint image, the third calibration image is an image obtained by performing summation and averaging on a plurality of frames of fingerprint images, and the plurality of frames of fingerprint images include the first fingerprint image, or the third calibration image is an image obtained by updating the first calibration image based on the first fingerprint image.

The method may be performed by a terminal device or a chip in the terminal device. Based on the foregoing solution, in a fingerprint enrollment process, calibration processing is performed on the enrolled fingerprint image, and whether the adaptive calibration image exists is determined. If the adaptive calibration image exists, the adaptive calibration image is adaptively updated based on the fingerprint image that is enrolled this time. If no adaptive calibration image exists, the adaptive calibration image may be generated based on the fingerprint image that is enrolled this time, or a factory calibration image is updated, so that the electronic device always stores a latest updated calibration image. Compared with the present calibration image that is not updated after delivery, in this embodiment of this application, the adaptive calibration image is introduced in the fingerprint enrollment procedure, so that a degree of adaptation between the calibration image of the electronic device and a current environment can be improved, thereby better calibrating the collected fingerprint image, improving a fingerprint unlocking rate and a fingerprint unlocking speed, and improving fingerprint recognition experience (for example, unlocking experience) of a user.

In a possible implementation, before the determining whether an adaptive calibration image exists in the electronic device, the method further includes:

determining whether an overlapping area between the first fingerprint image and a second fingerprint image is less than a first area threshold, where the second fingerprint image is an enrolled fingerprint image; and the determining whether an adaptive calibration image exists in the electronic device includes:

when the overlapping area between the first fingerprint image and the second fingerprint image is less than the first threshold, determining whether the adaptive calibration image exists in the electronic device.

Therefore, a fingerprint image, for example, the first fingerprint image, that has a small overlapping area with the second fingerprint image is screened out by introducing the first area threshold. This can avoid a case in which the adaptive calibration image is updated based on a fingerprint image that has a large overlapping area (or overlapping feature) with a historical enrolled fingerprint image.

In a possible implementation, before the determining whether an overlapping area between the first fingerprint image and a second fingerprint image is less than a first area threshold, the method further includes:

determining whether the first fingerprint image satisfies a first preset condition, where that the first fingerprint image satisfies a first preset condition includes: the first fingerprint image satisfies a real-finger scenario and/or the first fingerprint image satisfies a non-foreign object scenario.

Optionally, it is determined, according to an anti-counterfeit detection algorithm or another real/fake finger detection algorithm, that the first fingerprint image satisfies the real-finger scenario, to avoid updating, to the adaptive calibration image, a fingerprint image collected by using a fake finger or a fingerprint image collected in a foreign object scenario.

Optionally, it is recognized, according to a foreign object detection algorithm, that the first fingerprint image satisfies the non-foreign object scenario, to avoid updating the fingerprint image collected in the foreign object scenario to the adaptive calibration image.

Optionally, the determining whether an overlapping area between the first fingerprint image and a second fingerprint image is less than a first area threshold includes: when the first fingerprint image satisfies the first preset condition, determining whether the overlapping area between the first fingerprint image and the second fingerprint image is less than the first area threshold. Therefore, accuracy of the adaptive calibration image can be effectively improved by comprehensively considering factors such as the overlapping area, the real-finger scenario, and the non-foreign object scenario.

In a possible implementation, when the adaptive calibration image exists in the electronic device, the method further includes:

determining whether M frames of fingerprint images are currently accumulatively collected, where the M frames of fingerprint images include the first fingerprint image, the first fingerprint image is a last frame of image in the M frames of fingerprint images;

when the M frames of fingerprint images fail to be collected, skipping updating the first calibration image; and the adaptively updating the first calibration image based on the first fingerprint image and a first update coefficient includes:

when the M frames of fingerprint images are collected, adaptively updating the first calibration image based on the M frames of fingerprint images and the first update coefficient.

Therefore, the adaptive calibration image is adaptively updated only when a plurality of frames of fingerprint images are collected. If the plurality of frames of fingerprint images fail to be collected, the adaptive calibration image is not updated. This has an advantage that frequent update of the adaptive calibration image can be avoided. In addition, impact of a special fingerprint image (including but not limited to the fingerprint image of the fake finger, the fingerprint image collected in the foreign object scenario, and the fingerprint image that has the large overlapping area with the enrolled fingerprint) on the adaptive calibration image may be further reduced.

In a possible implementation, the updating the first calibration image based on the M frames of fingerprint images includes:

updating the first calibration image according to the following formula:

$$Y_1(N) = Y_1(N-1) * (1-\lambda_1) + \frac{\sum_{k=1}^{M} \text{Raw}(k)}{M} * \lambda_1$$

$Y_1(N)$ represents the second calibration image; $Y_1(N-1)$ represents the first calibration image; $\lambda_1$ represents the first update coefficient; and $$\frac{\sum_{k=1}^{M} \text{Raw}(k)}{M}$$

represents a value obtained after summation and averaging are performed on pixel values of the M frames of fingerprint images.

In a possible implementation, the updating the first calibration image based on the first fingerprint image and a first update coefficient when the adaptive calibration image exists in the electronic device includes:

performing fast Fourier transform processing on the first fingerprint image to obtain a third fingerprint image;

performing low-pass filtering processing on the third fingerprint image to obtain a fourth fingerprint image;

performing inverse fast Fourier transform processing on the fourth fingerprint image to obtain a fifth fingerprint image; and updating the first calibration image based on the fifth fingerprint image and the first quantity of update times, to obtain the second calibration image.

Therefore, when the adaptive calibration image is updated based on the first fingerprint image, image processing may be performed on the first fingerprint image in advance, to avoid updating interference noise of the first fingerprint image to the adaptive calibration image, thereby helping improve accuracy and quality of the adaptive calibration image.

In a possible implementation, the second calibration image satisfies the following formula:

$$Y_2(N) = Y_2(N-1) * (1-\lambda_2) + IFFT (\text{Filter} (FFT (\text{Raw}(k)))) * \lambda_2$$

$Y_2$ represents the second calibration image; $Y_2(N-1)$ represents the first calibration image; $\lambda_2$ represents the first update coefficient; and FFT( ) represents fast Fourier transform processing, Filter( ) represents low-pass filtering processing, and IFFT( ) represents inverse fast Fourier transform processing.

In a possible implementation, the second calibration image satisfies the following formula:

$$Y_3(N) = Y_3(N-1) * (1-\lambda_3) + \text{Raw}(k) * \lambda_3$$

$Y_3(N)$ represents the second calibration image; $Y_3(N-1)$ represents the first calibration image; $\lambda_3$ represents the first update coefficient; and Raw(k) represents a pixel value of the first fingerprint image.

In a possible implementation, when the third calibration image is the image obtained by performing summation and averaging on the plurality of frames of fingerprint images, a first quantity is greater than or equal to a first threshold, where the first quantity is used to represent a quantity of update times of the adaptive calibration image; or when the third calibration image is the image obtained by updating the first calibration image, the first quantity is less than the first threshold.

For example, if the first quantity is less than the first threshold, the adaptive calibration image is not generated in this case. In this case, another minimum guarantee policy may be provided. The factory calibration image is updated based on the currently collected first fingerprint image, to generate an updated factory calibration image, and the updated factory calibration image is used as the third calibration image. This has an advantage that if the adaptive calibration image is not generated, the factory calibration image can be updated to provide an alternative solution.

In a possible implementation, the generating a third calibration image based on the first fingerprint image includes:
- determining whether $Q_o$ is less than the first threshold, where $Q_o$ is used to represent an initial value of the first quantity;
- if $Q_o$ is less than the first threshold, updating the first calibration image based on the first fingerprint image and a second update coefficient, to obtain an updated factory calibration image;
- accumulating the pixel value of the first fingerprint image to a pixel accumulated value;
- performing processing of accumulating a second threshold on $Q_o$, to obtain $Q_n$, where $Q_n$ is used to represent an updated value of the first quantity;
- determining whether W reaches a third threshold, where W represents a quantity of fingerprint collection times; and
- when W does not reach the third threshold, determining whether $Q_n$ is less than the first threshold; or
- when $Q_n$ is greater than or equal to the first threshold, determining the third calibration image based on the pixel accumulated value, where the third calibration image is an image obtained by performing averaging on the pixel accumulated value, and the pixel accumulated value is obtained by performing summation on pixel values of the plurality of frames of fingerprint images; or
- when $Q_n$ is less than the first threshold, using the updated factory calibration image as the third calibration image.

Optionally, when $Q_n$ is greater than or equal to the first threshold, the generated adaptive calibration image satisfies the following formula:

$$AdaptiveBase = \frac{SUM\,(AdaptiveBase)}{Q_n}$$

SUM(AdaptiveBase) represents the pixel accumulated value of the plurality of frames of fingerprint images. AdaptiveBase represents the generated adaptive calibration image (or the third calibration image).

Optionally, when $Q_n$ is less than the first threshold, the factory calibration image is updated according to the following formula:

$$FactoryBase(N) = FactoryBase(N-1)*(1-\lambda_4) + Raw\,(k)*\lambda_4;$$

or $$FactoryBase(N) =$$
$$FactoryBase(N-1)*(1-\lambda_4) + IFFT\,(Filter\,(FFT\,(Raw\,(k))))*\lambda_4$$

FactoryBase(N) represents the updated factory calibration image; FactoryBase(N−1) represents the first calibration image (or the factory calibration image); $\lambda_4$ represents the second update coefficient; Raw(k) represents a pixel value of the first fingerprint image; and FFT( ) represents fast Fourier transform processing, Filter( ) represents low-pass filtering processing, and IFFT( ) represents inverse fast Fourier transform processing.

In a possible implementation, the method further includes:
- displaying a first interface, where the first interface includes a first option, and the first option is used to select to enable or disable a fingerprint calibration image update function. Therefore, a switch option of the fingerprint calibration image update function is provided for the user to select to enable or disable the fingerprint calibration image update function.

According to a second aspect, a fingerprint recognition method is provided. The method is applied to an electronic device, and the method includes:
- collecting a to-be-verified fingerprint image;
- performing calibration processing on the to-be-verified fingerprint image based on a fourth calibration image to obtain a sixth fingerprint image;
- verifying the sixth fingerprint image based on a fingerprint template;
- determining whether the sixth fingerprint image is successfully verified;
- after the sixth fingerprint image is successfully verified, determining whether an adaptive calibration image exists in the electronic device; and
- updating the fourth calibration image based on the sixth fingerprint image and a third update coefficient when the adaptive calibration image exists in the electronic device, to obtain a fifth calibration image, where the fourth calibration image is the adaptive calibration image; or
- updating a factory calibration image based on the sixth fingerprint image and a fourth update coefficient when no adaptive calibration image exists in the electronic device, to obtain a sixth calibration image, where the sixth calibration image is an updated factory calibration image, and the fourth calibration image is the factory calibration image.

The method may be performed by a terminal device or a chip in the terminal device. Based on the foregoing solution, in a fingerprint verification process, calibration processing is performed on the to-be-verified fingerprint image to determine whether the verification succeeds. If the verification succeeds, whether the adaptive calibration image exists continues to be determined. If the adaptive calibration image exists, the adaptive calibration image is adaptively updated based on the fingerprint image that passes the verification this time. If no adaptive calibration image exists, the factory calibration image may be updated based on the fingerprint image that passes the verification this time, so that the electronic device always stores a latest updated calibration image. This helps improve a fingerprint unlocking rate and a fingerprint unlocking speed, thereby improving fingerprint recognition experience (for example, unlocking experience) of a user.

In a possible implementation, before the determining whether an adaptive calibration image exists in the electronic device, the method further includes:
- determining whether the sixth fingerprint image satisfies a second preset condition, where that the sixth fingerprint image satisfies a second preset condition includes:
- the sixth fingerprint image satisfies a real-finger scenario and/or the sixth fingerprint image satisfies a non-foreign object scenario; and the determining whether an adaptive calibration image exists in the electronic device includes:

when the sixth fingerprint image satisfies the second preset condition, determining whether the adaptive calibration image exists in the electronic device.

Optionally, it is determined, according to an anti-counterfeit detection algorithm or another real/fake finger detection algorithm, that the sixth fingerprint image satisfies the real-finger scenario. In the fingerprint verification procedure, this can avoid updating, to the adaptive calibration image, a fingerprint image collected by using a fake finger or a fingerprint image collected in a foreign object scenario.

Optionally, it is recognized, according to a foreign object detection algorithm, that the sixth fingerprint image satisfies the non-foreign object scenario. In the fingerprint verification procedure, this can avoid updating the fingerprint image collected in the foreign object scenario to the adaptive calibration image.

In a possible implementation, the fifth calibration image satisfies the following formula:

$$Y_{adaptive}(N) = Y_{adaptive}(N-1)*(1-\lambda_4) + IFFT(\text{Filter}(FFT(\text{Raw}(s))))*\lambda_4;$$

or $$Y_{adaptive}(N) = Y_{adaptive}(N-1)*(1-\lambda_4) + \text{Raw}(s)*\lambda_4$$

$Y_{adaptive}(N)$ represents the fifth calibration image; $Y_{aptive}(N-1)$ represents the fourth calibration image; $\lambda_4$ represents the third update coefficient; and FFT( ) represents fast Fourier transform processing, Filter( ) represents low-pass filtering processing, IFFT( ) represents inverse fast Fourier transform processing, and Raw(s) represents a pixel value of the sixth fingerprint image.

In a possible implementation, the sixth calibration image satisfies the following formula:

$$Y_{update\ factory} = Y_{initial\ factory}*(1-\lambda_4) + IFFT(\text{Filter}(FFT(\text{Raw}(s))))*\lambda_4;$$

or $$Y_{update\ factory}(N) = Y_{initial\ factory}(N-1)*(1-\lambda_4) + \text{Raw}(s)*\lambda_4$$

$Y_{update\ factory}$ represents the sixth calibration image; $Y_{initial\ factor}$ represents the fourth calibration image; $\lambda_4$ represents the fourth update coefficient; and FFT( ) represents fast Fourier transform processing, Filter( ) represents low-pass filtering processing, IFFT( ) represents inverse fast Fourier transform processing, and Raw(s) represents a pixel value of the sixth fingerprint image.

In a possible implementation, the method further includes:

displaying a first interface, where the first interface includes a first option, and the first option is used to select to enable or disable a fingerprint calibration image update function.

According to a third aspect, a fingerprint recognition apparatus is provided, including a unit configured to perform the method in any implementation of the first aspect, or a unit configured to perform the method in any implementation of the second aspect. The apparatus may be a terminal (or a terminal device), or may be a chip in the terminal (or the terminal device). The apparatus includes an input unit, a display unit, and a processing unit.

When the apparatus is the terminal, the processing unit may be a processor, the input unit may be a communication interface, and the display unit may be a graphics processing module and a screen. The terminal may further include a memory, the memory is configured to store computer program code, and when the processor executes the computer program code stored in the memory, the terminal is enabled to perform any method in the first aspect.

When the apparatus is the chip in the terminal, the processing unit may be a logic processing unit inside the chip, the input unit may be an input interface, a pin, a circuit, or the like, and the display unit may be a graphics processing unit inside the chip. The chip may further include a memory, and the memory may be a memory (for example, a register or a cache) inside the chip, or may be a memory (for example, a read-only memory or a random access memory) outside the chip. The memory is configured to store computer program code, and when the processor executes the computer program code stored in the memory, the chip is enabled to perform any method in the first aspect.

According to a fourth aspect, a computer-readable storage medium is provided. The computer-readable storage medium stores computer program code, and when the computer program code is run by a fingerprint recognition apparatus, the apparatus is enabled to perform any method in the first aspect or the apparatus is enabled to perform any method in the second aspect.

According to a fifth aspect, a computer program product is provided. The computer program product includes computer program code, and when the computer program code is run by a fingerprint recognition apparatus, the apparatus is enabled to perform any method in the first aspect or the apparatus is enabled to perform any method in the second aspect.

DETAILED DESCRIPTION OF ILLUSTRATIVE EMBODIMENTS

Figure 1:
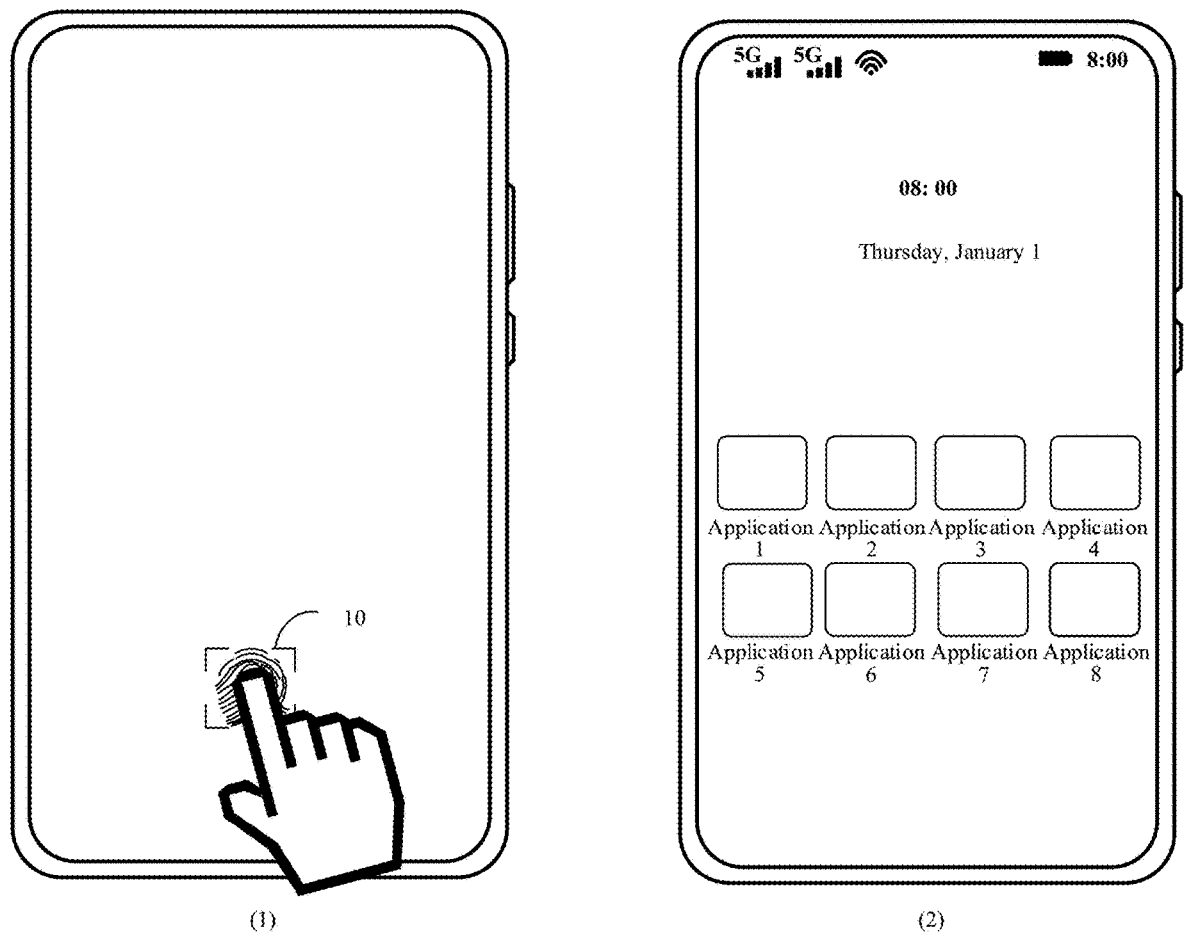
FIG. 1 is an example diagram of an application scenario according to an embodiment of this application.

The following describes technical solutions of embodiments in this application with reference to accompanying drawings.

A fingerprint recognition method provided in embodiments of this application may be applied to an electronic device having a fingerprint recognition function. For example, the electronic device may be an electronic device, for example, a mobile phone, a tablet computer, a notebook computer, a wearable device, a multimedia playback device, an e-book reader, a personal computer, a personal digital assistant (personal digital assistant, PDA), a netbook, an enhanced display (augmented reality, AR) device, or a virtual reality (virtual reality, VR) device. A specific form of the electronic device is not limited in this application.

As an example instead of limitation, when the electronic device is a wearable device, the wearable device may be a generic term of wearable devices, for example, glasses, gloves, watches, clothes, and shoes, developed through implementing an intelligent design on daily wear by using a wearable technology. The wearable device is a portable device that is directly worn on a human body or integrated into clothes or an accessory of a user, and may collect biometric feature data of the user. The wearable device is not only a hardware device, but also implements a powerful function through software support, data exchange, and cloud interaction. In an implementation, the wearable intelligent device includes a device that has full functions and a large size, and that can implement complete or partial functions without depending on a smartphone, for example, a smart watch or smart glasses. In another implementation, the wearable intelligent device may be a device that focuses on a type of application function and that needs to be used together with another device (for example, a smartphone), for example, a smart band or smart jewelry that includes an unlocked touchscreen.

An application scenario of fingerprint recognition is not specifically limited in this embodiment of this application, and all scenarios in which a fingerprint is used for recognition are applicable. For example, the user performs unlocking, payment, or identity authentication by using the fingerprint.

This embodiment of this application may be applied to an optical fingerprint recognition scenario. Optical fingerprint recognition mainly uses reflection and refraction principles of light. When a finger presses a screen, the screen lights up, the light illuminates a fingerprint, and then the fingerprint is reflected and refracted to a sensor in the screen for recognition. The fingerprint recognition scenario is not specifically limited in this embodiment of this application. This embodiment of this application may also be properly applied to another fingerprint recognition scenario, for example, ultrasonic fingerprint recognition and capacitive fingerprint recognition.

It may be understood that a location of a fingerprint module is not specifically limited in this embodiment of this application. For example, if an optical fingerprint recognition technology is used, the fingerprint module may be disposed below a screen (or a touchscreen) of an electronic device, that is, in-screen fingerprint recognition. For another example, the fingerprint module apparatus may also be disposed on a back, a side, or the like of the electronic device.

FIG. 1 is a schematic diagram of an application scenario according to an embodiment of this application. For example, an electronic device is a mobile phone. The mobile phone uses in-screen fingerprint unlocking. As shown in (1) in FIG. 1, a user presses a fingerprint unlocking area 10 on a screen by using a finger, to attempt to perform fingerprint unlocking. After the user presses the fingerprint unlocking area 10, the mobile phone matches a collected fingerprint with a fingerprint template prestored by the user. If the matching succeeds, the screen of the mobile phone is unlocked successfully.

It should be understood that the fingerprint unlocking area 10 shown in (1) in FIG. 1 is merely an example for description. This embodiment of this application is not limited thereto. Actually, the fingerprint unlocking area 10 may be located in another area on the screen, for example, a screen area close to a power button.

It should be further understood that fingerprint unlocking shown in (1) in FIG. 1 is described through in-screen fingerprint unlocking as an example. This embodiment of this application is not limited thereto. For example, this embodiment of this application is also applicable to rear fingerprint unlocking of the mobile phone.

It should be further understood that when enrolling the fingerprint, the user may also press the fingerprint unlocking area 10 on the screen by using the finger. After the user presses the fingerprint unlocking area 10 on the screen, the mobile phone may collect a fingerprint image.

If fingerprint matching succeeds, the user may enter a home screen of the mobile phone. In a possible case, for example, after fingerprint unlocking succeeds, the mobile phone displays an interface shown in (2) in FIG. 1, and icons of a plurality of applications are displayed on the interface, for example, an application 1 to an application 8. Certainly, the interface shown in (2) in FIG. 1 is merely a possible case, and this embodiment of this application is not limited thereto.

It should be understood that the scenario in FIG. 1 is merely an example for describing an application scenario of this application, and does not constitute a limitation on this embodiment of this application. This application is not limited thereto.

Figure 2:
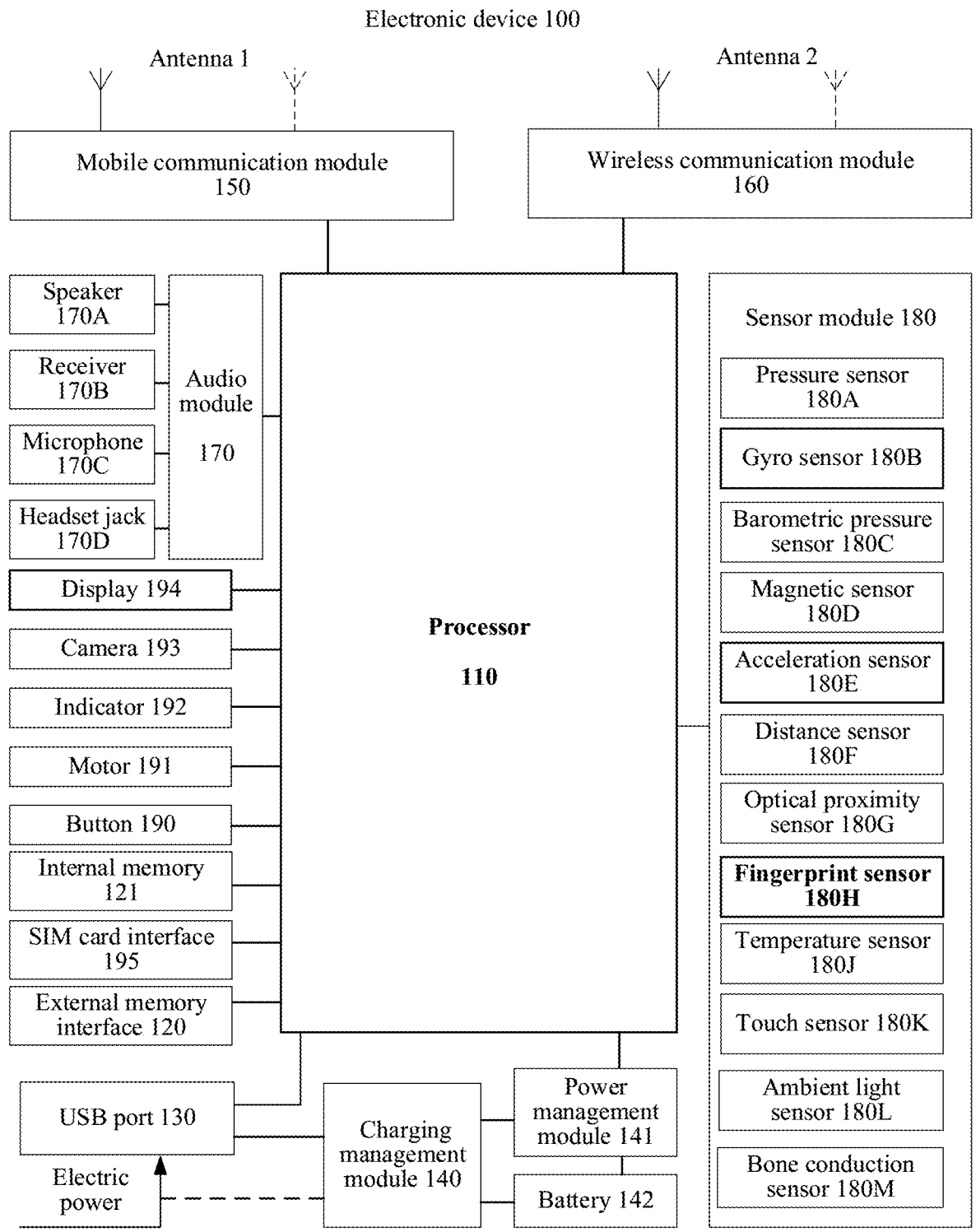
FIG. 2 is a schematic diagram of a hardware system of an electronic device applicable to this application.
Figure 3:
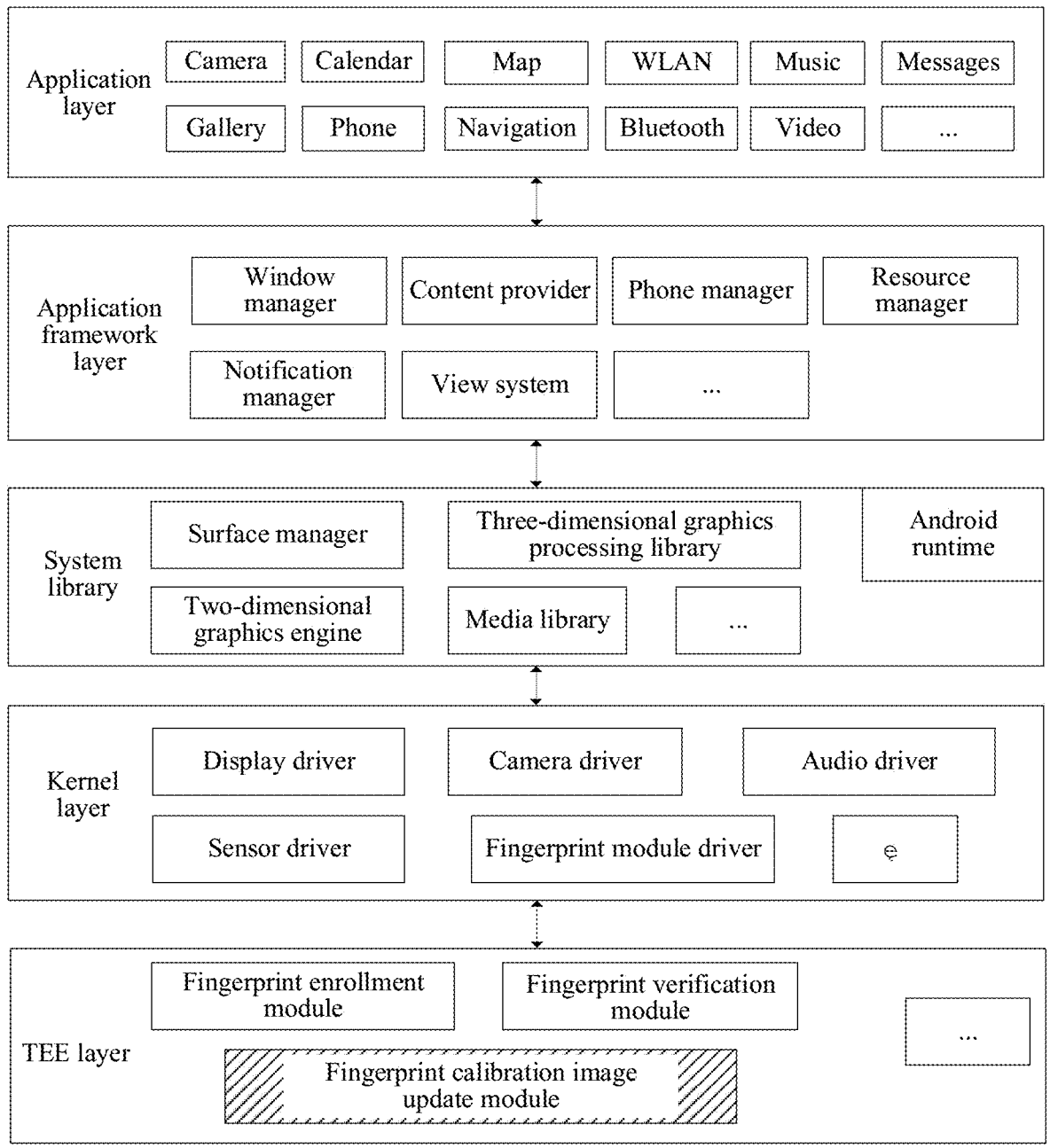
FIG. 3 is a schematic diagram of a software system of an electronic device applicable to this application.

The following describes, with reference to FIG. 2 and FIG. 3, a hardware system and a software architecture to which this embodiment of this application are applicable.

FIG. 2 shows a hardware system of an electronic device applicable to this application.

An electronic device 100 may be a mobile phone, a smart screen, a tablet computer, a wearable electronic device, an in-vehicle electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), a projector, or the like. A specific type of the electronic device 100 is not limited in this embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identifier module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that the structure shown in FIG. 2 does not constitute a specific limitation on the electronic device 100. In some other embodiments of this application, the electronic device 100 may include components more or fewer than those shown in FIG. 2, or the electronic device 100 may include a combination of some components in the components shown in FIG. 2, or the electronic device 100 may include subcomponents of some components in the components shown in FIG. 2. For example, the optical proximity sensor 180G shown in FIG. 2 may be optional. The components shown in FIG. 2 may be implemented by hardware, software, or a combination of software and hardware.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and a neural-network processing unit (neural-network processing unit, NPU). Different processing units may be independent components, or may be integrated components.

In some embodiments, the processor 110 is configured to: collect a to-be-enrolled fingerprint image;
  perform, based on a first calibration image, calibration processing on the to-be-enrolled fingerprint image to obtain a first fingerprint image; and
  determine whether an adaptive calibration image exists in the electronic device; and
  update the first calibration image based on the first fingerprint image and a first update coefficient when the adaptive calibration image exists in the electronic device, to obtain a second calibration image, where the first calibration image is the adaptive calibration image, and the second calibration image is used to perform calibration processing on the collected fingerprint image; or
  generate a third calibration image based on the first fingerprint image when no adaptive calibration image exists in the electronic device, where the third calibration image is used to perform calibration processing on the collected fingerprint image, the third calibration image is an image obtained by performing summation and averaging on a plurality of frames of fingerprint images, and the plurality of frames of fingerprint images include the first fingerprint image, or the third calibration image is an image obtained by updating the first calibration image based on the first fingerprint image.

In some embodiments, the processor 110 is configured to: collect a to-be-verified fingerprint image;
  perform calibration processing on the to-be-verified fingerprint image based on a fourth calibration image to obtain a sixth fingerprint image;
  verify the sixth fingerprint image based on a fingerprint template;
  determine whether the sixth fingerprint image is successfully verified;
  after the sixth fingerprint image is successfully verified, determine whether an adaptive calibration image exists in the electronic device; and
  update the fourth calibration image based on the sixth fingerprint image and a third update coefficient when the adaptive calibration image exists in the electronic device, to obtain a fifth calibration image, where the fourth calibration image is the adaptive calibration image; or
  update a factory calibration image based on the sixth fingerprint image and a fourth update coefficient when no adaptive calibration image exists in the electronic device, to obtain a sixth calibration image, where the sixth calibration image is an updated factory calibration image, and the fourth calibration image is the factory calibration image.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been recently used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

A connection relationship between the modules shown in FIG. 2 is merely used as an example for description, and does not constitute a limitation on the connection relationship between the modules of the electronic device 100. Optionally, the modules of the electronic device 100 may also use a combination of a plurality of connection manners in the foregoing embodiment.

The electronic device 100 may implement a display function by using the GPU, the display 194, the application processor, and the like. The GPU is a microprocessor for image processing, and is connected to the display 194 and the application processor. The GPU is configured to perform mathematical and geometrical calculation, and is configured to render an image. The processor 110 may include one or more GPUs that execute program instructions to generate or change display information.

The display 194 is configured to display an image or a video. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini light-emitting diode (mini light-emitting diode, Mini LED), a micro light-emitting diode (micro light-emitting diode, Micro LED), a micro OLED (Micro OLED), or a quantum dot light emitting diode (quantum dot light emitting diodes, QLED). In some embodiments, the electronic device 100 may include one or N displays 194, where N is a positive integer greater than 1.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may perform algorithm optimization on noise, brightness, and a color of an image, and the ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as red green blue (red green blue, RGB) or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The electronic device 100 may implement an audio function, for example, music playing and recording, through the audio module 170, the speaker 170A, the receiver 170B, the microphone 170C, the headset jack 170D, the application processor, and the like.

The pressure sensor 180A is configured to sense a pressure signal, and can convert the pressure signal into an electrical signal. In some embodiments, the pressure sensor 180A may be disposed on the display 194. There are many types of pressure sensors 180A, for example, there may be a resistive pressure sensor, an inductive pressure sensor, or a capacitive pressure sensor. The capacitive pressure sensor may include at least two parallel plates made of conductive materials. When force is applied to the pressure sensor 180A, capacitance between electrodes changes, and the electronic device 100 determines pressure intensity based on the change in the capacitance. When a touch operation is performed on the display 194, the electronic device 100 detects the touch operation based on the pressure sensor 180A. The electronic device 100 may also calculate a touch location based on a detection signal of the pressure sensor 180A.

The fingerprint sensor 180H is configured to collect a fingerprint. The electronic device 100 may use a feature of the collected fingerprint to implement functions such as unlocking, application lock access, photographing, and incoming call answering. The fingerprint sensor 180H may be implemented by using a fingerprint module. In some embodiments, the fingerprint module is an optical fingerprint module.

The touch sensor 180K is also referred to as a touch component. The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor 180K may transfer the detected touch operation to the application processor to determine a type of the touch event. A visual output related to the touch operation may be provided through the display 194. In some other embodiments, the touch sensor 180K may alternatively be disposed on a surface of the electronic device 100, and is disposed at a position different from that of the display 194.

The button 190 includes a power button and a volume button. The button 190 may be a mechanical button, or may be a touch button. The electronic device 100 may receive a button input signal, and implement a function related to the button input signal.

The motor 191 may generate vibration. The motor 191 may be used for an incoming call prompt, and may be further used for touch feedback. The motor 191 may generate different vibration feedback effects for touch operations performed on different applications. For touch operations performed on different areas of the display 194, the motor 191 may also generate different vibration feedback effects. Different application scenarios (for example, a time reminder, information receiving, an alarm clock, and a game) may correspond to different vibration feedback effects. A touch vibration feedback effect may be further customized.

A hardware system of the electronic device 100 is described above in detail. A software system of the electronic device 100 is described below. The software system may use a layered architecture, an event-driven architecture, a microkernel architecture, a micro service architecture, or a cloud architecture. In this embodiment of this application, the software system of the electronic device 100 is described by using the layered architecture as an example.

As shown in FIG. 3, the software system using the layered architecture is divided into several layers, and each layer has a clear role and task. The layers communicate with each other through a software interface. In some embodiments, the software system may be divided into five layers: an application layer, an application framework layer, an Android runtime (Android Runtime) and system library, a kernel layer, and a trusted execution environment (trusted execution environment, TEE) layer from top to bottom.

The application layer may include applications such as Camera, Gallery, Calendar, Phone, Map, Navigation, WLAN, Bluetooth, Music, Video, and Messages.

The application framework layer provides an application programming interface (application programming interface, API) and a programming framework for an application at the application layer. The application framework layer may include some predefined functions.

For example, the application framework layer includes a window manager, a content provider, a view system, a phone manager, a resource manager, a notification manager, and the like.

The window manager is configured to manage a window program. The window manager may obtain a size of a display, and determine whether there is a status bar, a screen is locked, and a screenshot is taken.

The content provider is configured to: store and obtain data, and enable the data to be accessed by an application. The data may include a video, an image, audio, calls that are made and answered, a browsing history and bookmarks, and an address book.

The view system includes visual controls such as a control for displaying text and a control for displaying a picture. The view system may be configured to construct an application. A display interface may include one or more views. For example, a display interface including a short message service message notification icon may include a view for displaying text and a view for displaying a picture.

The phone manager is configured to provide a communication function of the electronic device 100, for example, management of a call status (answering or declining).

The resource manager provides various resources such as a localized character string, an icon, a picture, a layout file, and a video file for an application.

The notification manager enables an application to display notification information in a status bar, and may be configured to convey a notification type message. The notification manager may automatically disappear after a short pause without requiring a user interaction. For example, the notification manager is used for download completion notification and message notification. The notification manager may further manage a notification that appears in the status bar at the top of the system in a form of a graph or scroll bar text, for example, a notification of an application running in background. The notification manager may further manage a notification that appears on the screen in a form of a dialog window. For example, text information is displayed in the status bar, an alert tone is made, the electronic device vibrates, and an indicator light flashes.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of function modules, such as, a surface manager (surface manager), a media library (Media Libraries), a three-dimensional graphics processing library (for example, an open graphics library for embedded systems (open graphics library for embedded systems, OpenGL ES), and a 2D graphics engine (for example, a skia graphics library (skia graphics library, SGL)).

The surface manager is configured to: manage a display subsystem and provide fusion of a 2D layer and a 3D layer for a plurality of applications.

The media library supports playback and recording of a plurality of audio formats, playback and recording of a plurality of video formats, and static image files. The media library may support a plurality of audio and video encoding formats, for example, MPEG4, H.264, a moving picture experts group audio layer 3 (moving picture experts group audio layer III, MP3), advanced audio coding (advanced audio coding, AAC), an adaptive multi-rate (adaptive multi-rate, AMR), a joint photographic experts group (joint photographic experts group, JPG), and portable network graphics (portable network graphics, PNG).

The three-dimensional graphics processing library may be configured to implement three-dimensional graphics drawing, image rendering, synthesis, and layer processing.

The two-dimensional graphics engine is a drawing engine for 2D drawing.

The kernel layer is a layer between hardware and software. The kernel layer may include driver modules such as a fingerprint module driver, a display driver, a camera driver, an audio driver, and a sensor driver.

The TEE layer can provide a security service for the Android system. The TEE layer is configured to execute various biometric recognition algorithms. The TEE layer is usually configured to run key operations: (1) mobile payment: fingerprint verification, PIN code input, and the like; (2) confidential data: secure storage of a private key, a certificate, and the like; and (3) included content: digital rights protection, digital rights management (digital rights management, DRM), or the like.

In some possible embodiments, the TEE layer includes a fingerprint enrollment module, a fingerprint verification module, and a fingerprint calibration image update module. The fingerprint calibration image update module is configured to adaptively update a fingerprint calibration image. The fingerprint calibration image update module may be independently disposed in the TEE, or may be disposed in the fingerprint enrollment module, or may be disposed in the fingerprint verification module.

In some embodiments, the fingerprint enrollment module is configured to collect a to-be-enrolled fingerprint image. The fingerprint calibration image update module is configured to: perform, based on a first calibration image, calibration processing on the to-be-enrolled fingerprint image to obtain a first fingerprint image; determine whether an adaptive calibration image exists in the electronic device; and update the first calibration image based on the first fingerprint image and a first update coefficient when the adaptive calibration image exists in the electronic device, to obtain a second calibration image, where the first calibration image is the adaptive calibration image, and the second calibration image is used to perform calibration processing on the collected fingerprint image; or generate a third calibration image based on the first fingerprint image when no adaptive calibration image exists in the electronic device, where the third calibration image is used to perform calibration processing on the collected fingerprint image, the third calibration image is an image obtained by performing summation and averaging on a plurality of frames of fingerprint images, and the plurality of frames of fingerprint images include the first fingerprint image, or the third calibration image is an image obtained by updating the first calibration image based on the first fingerprint image.

In some embodiments, the fingerprint verification module is configured to: collect a to-be-verified fingerprint image; perform calibration processing on the to-be-verified fingerprint image based on a fourth calibration image to obtain a sixth fingerprint image; verify the sixth fingerprint image based on a fingerprint template; and determine whether the sixth fingerprint image is successfully verified. The fingerprint calibration image update module is configured to: after the sixth fingerprint image is successfully verified, determine whether an adaptive calibration image exists in the electronic device; and update the fourth calibration image based on the sixth fingerprint image and a third update coefficient when the adaptive calibration image exists in the electronic device, to obtain a fifth calibration image, where the fourth calibration image is the adaptive calibration image; or update a factory calibration image based on the sixth fingerprint image and a fourth update coefficient when no adaptive calibration image exists in the electronic device, to obtain a sixth calibration image, where the sixth calibration image is an updated factory calibration image, and the fourth calibration image is the factory calibration image.

For example, the fingerprint module driver at the kernel layer invokes the fingerprint module to collect fingerprint data, and then transmits the collected fingerprint data to the TEE layer for processing.

It should be understood that the foregoing describes the structural diagram of the electronic device by using an example based on FIG. 2, and describes a software architecture in this embodiment of this application by using an example in FIG. 3. However, this embodiment of this application is not limited thereto.

Generally, a factory fingerprint calibration image (factory base) is preset in an electronic device during production in a production line. The factory fingerprint calibration image is used to fit noise of an optical fingerprint component and a screen. The factory fingerprint calibration image can be represented by a group of parameters. A size of the factory fingerprint calibration image is the same as that of a fingerprint image collected by the optical fingerprint component. Calibration of the fingerprint image can be implemented by subtracting the fingerprint calibration image from the fingerprint image collected by the optical fingerprint component. However, as a user uses the electronic device or an external environment changes, an effect of the fingerprint calibration image preset in the electronic device before delivery becomes worse, and the collected fingerprint image cannot be better calibrated.

For unified description herein, the fingerprint calibration image may also be referred to as a fingerprint calibration template, a calibration image (base), or the like. For ease of description, the calibration image is used for description in this embodiment of this application.

In view of this, an embodiment of this application proposes a fingerprint recognition method. An adaptive calibration image (adaptive base) is introduced in a fingerprint enrollment procedure or a fingerprint verification procedure, and a calibration image (for example, a factory fingerprint calibration image) of an electronic device is adaptively updated, to improve a degree of adaptation between the calibration image and a current environment, and improve unlocking experience of a user.

The following describes a fingerprint recognition method according to an embodiment of this application with reference to FIG. 4 to FIG. 8. It may be understood that the fingerprint recognition method shown below may be implemented in an electronic device (for example, the electronic device shown in FIG. 2) having the foregoing hardware structure.

Figure 4:
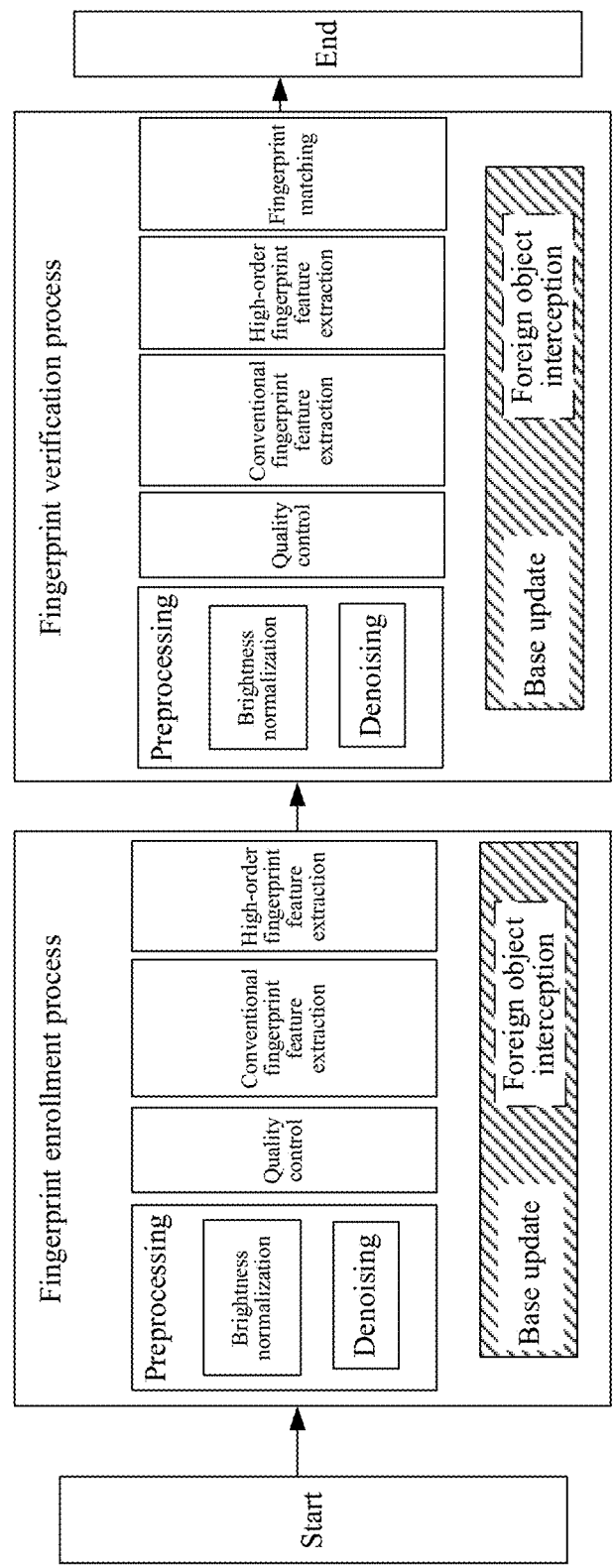
FIG. 4 is a schematic block diagram of a global procedure of fingerprint recognition.

FIG. 4 is a schematic block diagram of a global procedure of fingerprint recognition. As shown in FIG. 4, fingerprint recognition usually includes a fingerprint enrollment process and a fingerprint verification process. For example, the fingerprint enrollment process may be implemented by using the fingerprint enrollment module in FIG. 3, and the fingerprint verification process may be implemented by using the fingerprint verification module in FIG. 3. As shown in FIG. 4, both the fingerprint enrollment process and the fingerprint verification process may include a calibration image (Base) update procedure. Optionally, the calibration image (Base) update procedure may include a foreign object interception procedure. In this embodiment of this application, both the fingerprint enrollment process and the fingerprint verification process may involve an update process of a fingerprint calibration image. The following separately describes specific update methods of the update process of the fingerprint calibration image in the fingerprint enrollment process and the fingerprint verification process.

The fingerprint enrollment process may be understood as a process of preprocessing a collected fingerprint image of a user, extracting a feature based on a preprocessed fingerprint image, and finally storing the extracted fingerprint feature as a fingerprint template.

For example, the fingerprint enrollment process usually involves the following processing procedures: preprocessing (including brightness normalization, denoising, and the like), quality control, conventional fingerprint feature extraction, high-order fingerprint feature extraction, and template compression and storage.

The preprocessing is a process of performing image processing such as brightness normalization and denoising on the collected fingerprint image.

The denoising is to perform image denoising processing on the fingerprint image to eliminate noise interference of the fingerprint image. A denoising method is not specifically limited in this embodiment of this application. For example, the denoising method uses wavelet transform, bilateral filtering, and the like.

It should be understood that the foregoing description is merely provided by using an example in which the preprocessing includes brightness normalization and denoising. This embodiment of this application is not limited thereto. Actually, the preprocessing may include other processing operations, such as filtering processing, image enhancement processing, and binarization processing.

The quality control is to determine image quality of a preprocessed fingerprint image, filters out a low-quality fingerprint image, and obtains a high-quality fingerprint image for enrollment.

The conventional fingerprint feature extraction refers to a process of preliminarily extracting a fingerprint feature based on a denoised fingerprint image. A conventional fingerprint feature may be understood as an overall fingerprint feature (or a global fingerprint feature).

The high-order fingerprint feature extraction refers to a process of extracting a detailed fingerprint feature point from a refined fingerprint image. A high-order fingerprint feature may be understood as a local feature that is more detailed than a conventional fingerprint feature.

The template compression and storage refers to a process of storing an extracted fingerprint feature. Generally, a result of the extracted fingerprint feature is stored as a feature template for storage.

For example, the fingerprint verification process may be understood as a process of preprocessing a to-be-verified fingerprint image after the to-be-verified fingerprint image is collected, and performing feature matching based on a preprocessed to-be-verified fingerprint image and a fingerprint template.

For example, the fingerprint verification process involves the following processing procedures: preprocessing (including brightness normalization, denoising, and the like), quality control, conventional fingerprint feature extraction, high-order fingerprint feature extraction, and fingerprint matching.

For descriptions of the preprocessing, the denoising, the quality control, the conventional fingerprint feature extraction, and the high-order fingerprint feature extraction, refer to the descriptions in the fingerprint enrollment process. For brevity, details are not described herein again.

It should be understood that the schematic block diagram of the procedure shown in FIG. 4 is merely an example for description, and this embodiment of this application is not limited thereto.

Figure 5:
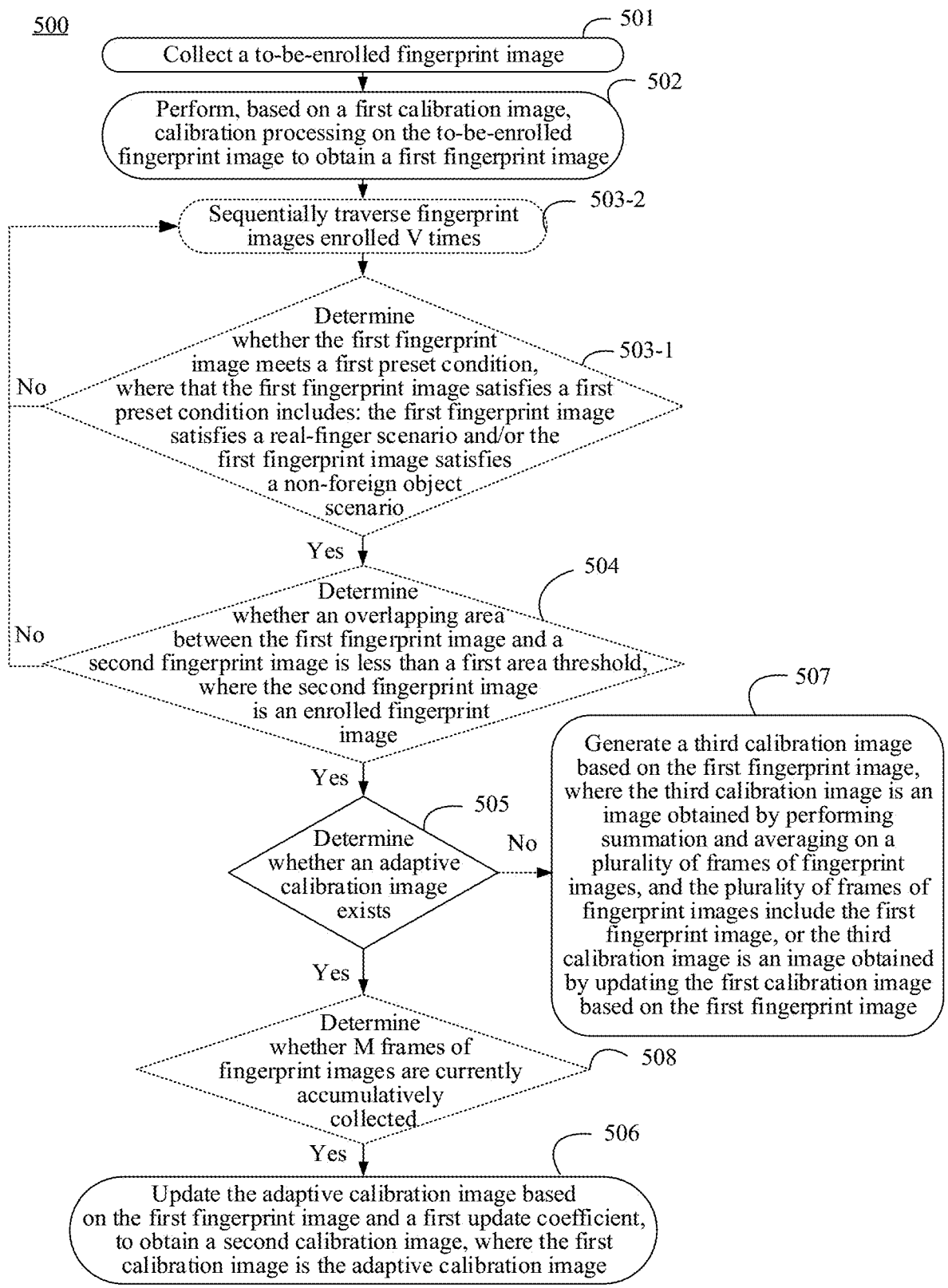
FIG. 5 is a schematic flowchart of a fingerprint recognition method according to an embodiment of this application.

The following describes a fingerprint enrollment procedure in an embodiment of this application with reference to an example in FIG. 5. FIG. 5 is a schematic flowchart of a fingerprint recognition method 500 according to an embodiment of this application. It should be understood that the method 500 shown in FIG. 5 may be applied to the fingerprint unlocking scenario shown in FIG. 1. As shown in FIG. 5, the method 500 includes the following steps.

Step 501: Collect a to-be-enrolled fingerprint image.

For example, when performing fingerprint enrollment, a user implements a fingerprint feature enrollment process by pressing a fingerprint unlocking area. A fingerprint module collects a feature of the to-be-enrolled fingerprint image based on pressing of the user. For example, in an optical fingerprint scenario, the user enrolls a fingerprint by pressing the fingerprint unlocking area (for example, the fingerprint unlocking area 10 shown in (1) in FIG. 1).

It should be understood that, when performing the fingerprint enrollment, for a same finger, the user may press for a plurality of times, so as to fully collect a fingerprint feature. The fingerprint enrollment may be understood as a process of collecting the fingerprint feature of the user.

The collected to-be-enrolled fingerprint image herein is an original RAW image, that is, original image data that is not processed through image processing.

Step 502: Perform, based on a first calibration image (referred to as a first fingerprint calibration image, a first fingerprint calibration template, or the like), calibration processing on the to-be-enrolled fingerprint image to obtain a first fingerprint image.

It should be noted that the first calibration image herein may be an adaptive calibration image, or may be a factory calibration image. If the first calibration image is the adaptive calibration image, calibration processing is performed on the to-be-enrolled fingerprint image based on the adaptive calibration image. If the first calibration image is the factory calibration image, calibration processing is performed on the to-be-enrolled fingerprint image based on the factory calibration image.

The calibration processing is a process of performing image calibration on the collected fingerprint image based on the first calibration image. The calibration processing may also be referred to as a process of fingerprint image preprocessing.

In addition, it should be noted that the calibration processing is performed on the original RAW image of the collected fingerprint image, that is, image data that is not processed.

For example, performing the calibration processing on the to-be-enrolled fingerprint image based on the first calibration image includes the following steps: step (1): perform pixel subtraction on the RAW image of the to-be-enrolled fingerprint image and the first calibration image, and perform normalization processing on an obtained result; and step (2): perform median filtering processing on a normalization result obtained in step (1), so that pixels of the fingerprint image are at a same brightness level. After processing in step (1) and step (2), the first fingerprint image may be obtained. The first fingerprint image may be used in an update procedure of the calibration image.

It should be understood that the foregoing calibration processing process is merely an example for description, and this embodiment of this application is not limited thereto.

To improve reliability of the first fingerprint image, another determining factor may be further introduced to evaluate the first fingerprint image, to improve effectiveness of the adaptive calibration image, for example, determining of a real/fake finger, a foreign object scenario, or an overlapping area with an enrolled fingerprint. It should be understood that a sequence of determining the real/fake finger, determining whether there is the foreign object scenario, and determining the overlapping area with the enrolled fingerprint is not specifically limited in this embodiment of this application. The following step 503-1 and step 504 are merely examples for description, and this embodiment of this application is not limited thereto.

Optionally, in step 503-1, whether the first fingerprint image satisfies a first preset condition is determined, where that the first fingerprint image satisfies a first preset condition includes: the first fingerprint image satisfies a real-finger scenario and/or the first fingerprint image satisfies a non-foreign object scenario. When the first fingerprint image satisfies the first preset condition, step 504 or step 505 may be performed; or when the first fingerprint image does not satisfy the first preset condition, step 503-2 may be performed.

In this embodiment of this application, an algorithm for detecting whether the fingerprint image satisfies the real-finger scenario and an algorithm for recognizing whether the fingerprint image is collected in the non-foreign object scenario are not specifically limited.

For example, it is determined, according to an anti-counterfeit detection algorithm or another real/fake finger detection algorithm, that the first fingerprint image satisfies the real-finger scenario, to avoid updating, to the adaptive calibration image, a fingerprint image collected by using a fake finger or a fingerprint image collected in a foreign object scenario.

For example, it is recognized, according to a foreign object detection algorithm, that the first fingerprint image satisfies the non-foreign object scenario, to avoid updating the fingerprint image collected in the foreign object scenario to the adaptive calibration image.

Optionally, in step 503-2, fingerprint images enrolled V times are sequentially traversed, and step 503-1 and step 504 are performed. It should be understood that the fingerprint image enrolled V times herein are fingerprint images obtained after calibration processing is performed based on the first calibration image. V is an integer greater than or equal to 2.

Optionally, in step 504, when the first fingerprint image satisfies the first preset condition, whether an overlapping area between the first fingerprint image and a second fingerprint image is less than a first area threshold is determined. The second fingerprint image is an enrolled fingerprint image. When the overlapping area between the first fingerprint image and the second fingerprint image is less than the first area threshold, step 505 is performed; or when the overlapping area between the first fingerprint image and the second fingerprint image is not less than the first area threshold, step 503-2 is performed.

For example, the second fingerprint image may be a fingerprint image in the fingerprint images enrolled V times. A collection moment of the second fingerprint image is earlier than a collection moment of the first fingerprint image.

For example, if the overlapping area between the first fingerprint image and the second fingerprint image is large, it indicates that the finger of the user does not move too much during fingerprint enrollment this time. It is possible that a feature collected this time is still the same as a previously collected finger feature, or even a finger feature at a same location. This case is not recommended. To collect more features of a same finger, a fingerprint image, for example, the first fingerprint image, that has a small overlapping area with the second fingerprint image is screened out by introducing the first area threshold. This can avoid a case in which the adaptive calibration image is updated based on a fingerprint image that has a large overlapping area (or overlapping feature) with a historical enrolled fingerprint image.

It should be understood that, herein, the second fingerprint image is generally referred to as an enrolled fingerprint image. This is not limited in this embodiment of this application. Actually, a plurality of enrolled fingerprint images (for example, the fingerprint images enrolled V times mentioned in step 503-2) may be traversed, to compare overlapping areas between the plurality of enrolled fingerprint images and the first fingerprint image. For example, it is assumed that a first fingerprint image enrolled this time is enrolled for the fourth time, and fingerprint images have been enrolled for three times before this. The fingerprint images collected for the previous three times are separately traversed with the first fingerprint image collected for the fourth time, and overlapping areas between the first fingerprint image collected for the fourth time and the fingerprint images collected for the previous three times each are less than the first area threshold.

Step 505: Determine (or determine) whether the adaptive calibration image exists in an electronic device.

Optionally, step 505 includes: when the overlapping area between the first fingerprint image and the second fingerprint image is less than the first threshold, determining whether the adaptive calibration image exists in the electronic device.

For example, whether the adaptive calibration image exists in the electronic device may be determined. If the adaptive calibration image exists in the electronic device, step 506 is performed, that is, the present adaptive calibration image is updated. If no adaptive calibration image exists in the electronic device, step 507 is performed, that is, the adaptive calibration image is initially generated.

A manner of recognizing whether the adaptive calibration image exists in the electronic device is not specifically limited in this embodiment of this application. For example, whether the adaptive calibration image exists may be determined by using a recognition identifier. For example, a factory calibration image is preset in the electronic device, and an identifier of the factory calibration image is different from the identifier of the adaptive calibration image.

Step 506: Update the first calibration image based on the first fingerprint image and a first update coefficient when the adaptive calibration image exists in the electronic device, to obtain a second calibration image, where the first calibration image is the adaptive calibration image, and the second calibration image is used to perform calibration processing on the collected fingerprint image.

The second calibration image may be understood as an updated adaptive calibration image. After the second calibration image is obtained, calibration processing is performed on a subsequently collected fingerprint image based on the second calibration image. A related process of calibration processing is similar to the foregoing process of performing calibration processing based on the first calibration image. This embodiment of this application provides a plurality of manners for calculating the second calibration image, and details are described below.

In addition, after obtaining the second calibration image, the electronic device may no longer store the first calibration image, or the electronic device always stores a latest adaptive calibration image. This helps save storage space of the electronic device.

For example, when the adaptive calibration image exists in the electronic device, the calibration image based on which calibration processing is performed on the first fingerprint image is the adaptive calibration image, that is, the first calibration image.

For example, "updating the first calibration image based on the first fingerprint image and a first update coefficient, to obtain a second calibration image" may be understood as: obtaining an updated adaptive calibration image (for example, the second calibration image) based on the first update coefficient, a pixel value of the first fingerprint image, and a series of calculations performed by the first calibration image.

The first update coefficient is an update coefficient for updating the first calibration image. It may be understood that a value of the first update coefficient is not specifically limited in this embodiment of this application.

Step 507: Generate a third calibration image based on the first fingerprint image when no adaptive calibration image exists in the electronic device (in this case, the foregoing first calibration image is the factory calibration image), where the third calibration image is used to perform calibration processing on the collected fingerprint image, the third calibration image is an image obtained by performing summation and averaging on a plurality of frames of fingerprint images, and the plurality of frames of fingerprint images include the first fingerprint image, or the third calibration image is an image obtained by updating the first calibration image based on the first fingerprint image. The first calibration image is the factory calibration image.

The third calibration image may be understood as an initially generated adaptive calibration image, or a calibration image obtained after the factory calibration image is updated. After the third calibration image is obtained, calibration processing is performed on a subsequently collected fingerprint image based on the third calibration image. A related process of calibration processing is similar to the foregoing process of performing calibration processing based on the first calibration image. This embodiment of this application provides a plurality of manners for calculating the third calibration image, and details are described below. In addition, after obtaining the third calibration image, the electronic device may no longer store the first calibration image, or the electronic device always stores a latest calibration image. This helps save storage space of the electronic device.

When no adaptive calibration image exists in the electronic device, the first calibration image is the factory calibration image (that is, the factory calibration image preset in the electronic device).

For example, in a scenario in which a fingerprint is initially enrolled, the calibration image in the electronic device is the factory calibration image, or no adaptive calibration image may exist. When no adaptive calibration image exists in the electronic device, the adaptive calibration image may be generated, or the factory calibration image is updated.

In this embodiment of this application, in a fingerprint enrollment process, calibration processing is performed on the enrolled fingerprint image, and whether the adaptive calibration image exists is determined. If the adaptive calibration image exists, the adaptive calibration image is adaptively updated based on the fingerprint image that is enrolled this time. If no adaptive calibration image exists, the adaptive calibration image may be generated based on the fingerprint image that is enrolled this time, or the factory calibration image is updated, so that the electronic device always stores a latest updated calibration image. Compared with the prior art in which the factory calibration image that is not updated after delivery, in this embodiment of this application, the adaptive calibration image is introduced in the fingerprint enrollment procedure, so that a degree of adaptation between the calibration image of the electronic device and a current environment can be improved, thereby better calibrating the collected fingerprint image, improving a fingerprint unlocking rate and a fingerprint unlocking speed, and improving fingerprint recognition experience (for example, unlocking experience) of a user.

When the adaptive calibration image exists in the electronic device, this embodiment of this application provides three manners of updating the adaptive calibration image. Detailed descriptions are separately provided below.

Manner 1

Optionally, in an embodiment, for step 506, updating the first calibration image based on the first fingerprint image and the first update coefficient includes:
updating the first calibration image according to the following formula:

$$Y_3(N) = Y_3(N-1)*(1-\lambda_3) + \text{Raw}(k)*\lambda_3$$

Alternatively, in Manner 1, the second calibration image satisfies the following formula. $Y_3(N)$ represents the second calibration image; $Y_3(N-1)$ represents the first calibration image; $\lambda_3$ represents the first update coefficient; and Raw(k) represents a pixel value of the first fingerprint image.

In Manner 1, iterative update of the adaptive calibration image may be implemented, so that the adaptive calibration image can be better applied to a fingerprint recognition scenario, thereby better satisfying a personal application scenario of the user.

Manner 2

Optionally, in an embodiment, for step 506, updating the first calibration image based on the first fingerprint image and the first update coefficient includes:
performing fast Fourier transform processing on the first fingerprint image to obtain a third fingerprint image;
performing low-pass filtering processing on the third fingerprint image to obtain a fourth fingerprint image;
performing inverse fast Fourier transform processing on the fourth fingerprint image to obtain a fifth fingerprint image; and
updating the first calibration image based on the fifth fingerprint image and the first quantity of update times, to obtain the second calibration image.

The fast Fourier transform processing is used to convert the pixel value of the first fingerprint image from time domain to frequency domain, to prepare for subsequent low-pass filtering processing.

The low-pass filtering processing is used to remove a high-frequency component of the fingerprint image, to suppress noise of the fingerprint image, improve quality of the fingerprint image, and help improve accuracy of the fingerprint calibration image.

The inverse fast Fourier transform processing is used to transform a fingerprint image obtained after the low-pass filtering processing from frequency domain to time domain, to prepare for subsequently calculating the adaptive calibration image by using the pixel value of the fingerprint image.

According to the foregoing processing procedure, noise of the fingerprint image can be avoided to be updated to the adaptive calibration image, thereby helping improve accuracy and quality of the adaptive calibration image.

Optionally, in Manner 2, updating the first calibration image based on the first fingerprint image and the first update coefficient includes:
updating the first calibration image according to the following formula:

$$Y_2(N) = Y_2(N-1)*(1-\lambda_2) + \text{IFFT (Filter}(FFT(\text{Raw}(k))))*\lambda_2$$

Alternatively, in Manner 2, the second calibration image satisfies the following formula. $Y_2$ represents the second calibration image; $Y_2(N-1)$ represents the first calibration image; $\lambda_2$ represents the first update coefficient; and FTT( ) represents fast Fourier transform processing, Filter( ) represents low-pass filtering processing, and IFFT( ) represents inverse fast Fourier transform processing.

In Manner 2, when the adaptive calibration image is updated based on the first fingerprint image, image processing may be performed on the first fingerprint image in advance, to avoid updating interference noise of the first fingerprint image to the adaptive calibration image, thereby helping improve accuracy and quality of the adaptive calibration image.

It should be understood that Manner 2 shows only a part of the processing process of the first fingerprint image. This embodiment of this application is not limited thereto. Actually, a person skilled in the art may properly add, based on the foregoing processing procedure, another processing procedure for improving image quality of the first fingerprint image, which falls within the protection scope of this embodiment of this application.

Manner 3

Optionally, in an embodiment, when the adaptive calibration image exists in the electronic device, before step 506, the method 500 further includes:
S508: Determine whether M frames of fingerprint images are currently accumulatively collected, where the M frames of fingerprint images include the first fingerprint image. M is an integer greater than or equal to 2.

For example, if the M frames of fingerprint images are accumulatively collected, the first fingerprint image may be a last frame of image in the M frames of fingerprint images.

Optionally, when the M frames of fingerprint images fail to be collected, the first calibration image is not updated.

When the M frames of fingerprint images are collected, adaptively updating the first calibration image based on the first fingerprint image and the first update coefficient includes: adaptively updating the first calibration image based on the M frames of fingerprint images and the first update coefficient.

In other words, when it is determined that the adaptive calibration image (for example, the first calibration image) exists, it may be further determined whether a plurality of frames (for example, M frames) of fingerprint images are currently collected. The adaptive calibration image is adaptively updated only if the plurality of frames of fingerprint images are collected. If the plurality of frames of fingerprint images fail to be collected, the adaptive calibration image is not updated. This has an advantage that frequent update of the adaptive calibration image can be avoided. In addition, impact of a special fingerprint image (including but not limited to the fingerprint image of the fake finger, the fingerprint image collected in the foreign object scenario, and the fingerprint image that has the large overlapping area with the enrolled fingerprint) on the adaptive calibration image may be further reduced.

Optionally, adaptively updating the first calibration image based on the M frames of fingerprint images and the first update coefficient includes: performing summation and averaging on the M frames of fingerprint images to obtain an average value, and then adaptively updating the first calibration image based on the average value and the first update coefficient.

For example, updating the first calibration image based on the M frames of fingerprint images includes:
updating the first calibration image according to the following formula:

$$Y_1(N) = Y_1(N-1)*(1-\lambda_1) + \frac{\sum_{k=1}^{M} \text{Raw}(k)}{M} *\lambda_1$$

Alternatively, the second calibration image satisfies the following formula. $Y_1(N)$ represents the second calibration image; $Y_1(N-1)$ represents the first calibration image; $\lambda_1$ represents the first update coefficient; and $$\frac{\sum_{k=1}^{M} \text{Raw}(k)}{M}$$

represents a value obtained after summation and averaging are performed on pixel values of the M frames of fingerprint images.

In Manner 3, when the adaptive calibration image is updated based on the first fingerprint image, the adaptive calibration image is updated only after the plurality of frames of fingerprint images are collected, so that frequent update of the adaptive calibration image can be avoided, and power consumption of the electronic device can be reduced. In addition, impact of a special fingerprint image on the adaptive calibration image may be reduced.

The foregoing describes a case in which the adaptive calibration image exists in the electronic device. When no adaptive calibration image exists in the electronic device, this embodiment of this application further provides a manner of generating the adaptive calibration image. Detailed descriptions are provided below.

Optionally, whether the adaptive calibration image is generated may be determined based on a value of a first quantity. The first quantity is used to represent a quantity of update times of the adaptive calibration image. For example, the first quantity is represented by an adaptive count.

For example, if the first quantity is greater than or equal to a first threshold, an image obtained by performing summation and averaging on the plurality of frames of fingerprint images may be used as the adaptive calibration image (for example, the third calibration image). In other words, summation and averaging are performed on the plurality of frames of fingerprint images to generate the third calibration image. In other words, when the third calibration image is the image obtained by performing summation and averaging on the plurality of frames of fingerprint images, the first quantity is greater than or equal to the first threshold.

For example, if the first quantity is less than the first threshold, the adaptive calibration image is not generated in this case. In this case, another minimum guarantee policy may be provided. The factory calibration image is updated based on the currently collected first fingerprint image, to generate an updated factory calibration image, and the updated factory calibration image is used as the third calibration image. In other words, when the third calibration image is the image obtained by updating the first calibration image, the first quantity is less than the first threshold. This has an advantage that if the adaptive calibration image is not generated, the factory calibration image can be updated to provide an alternative solution.

Figure 6:
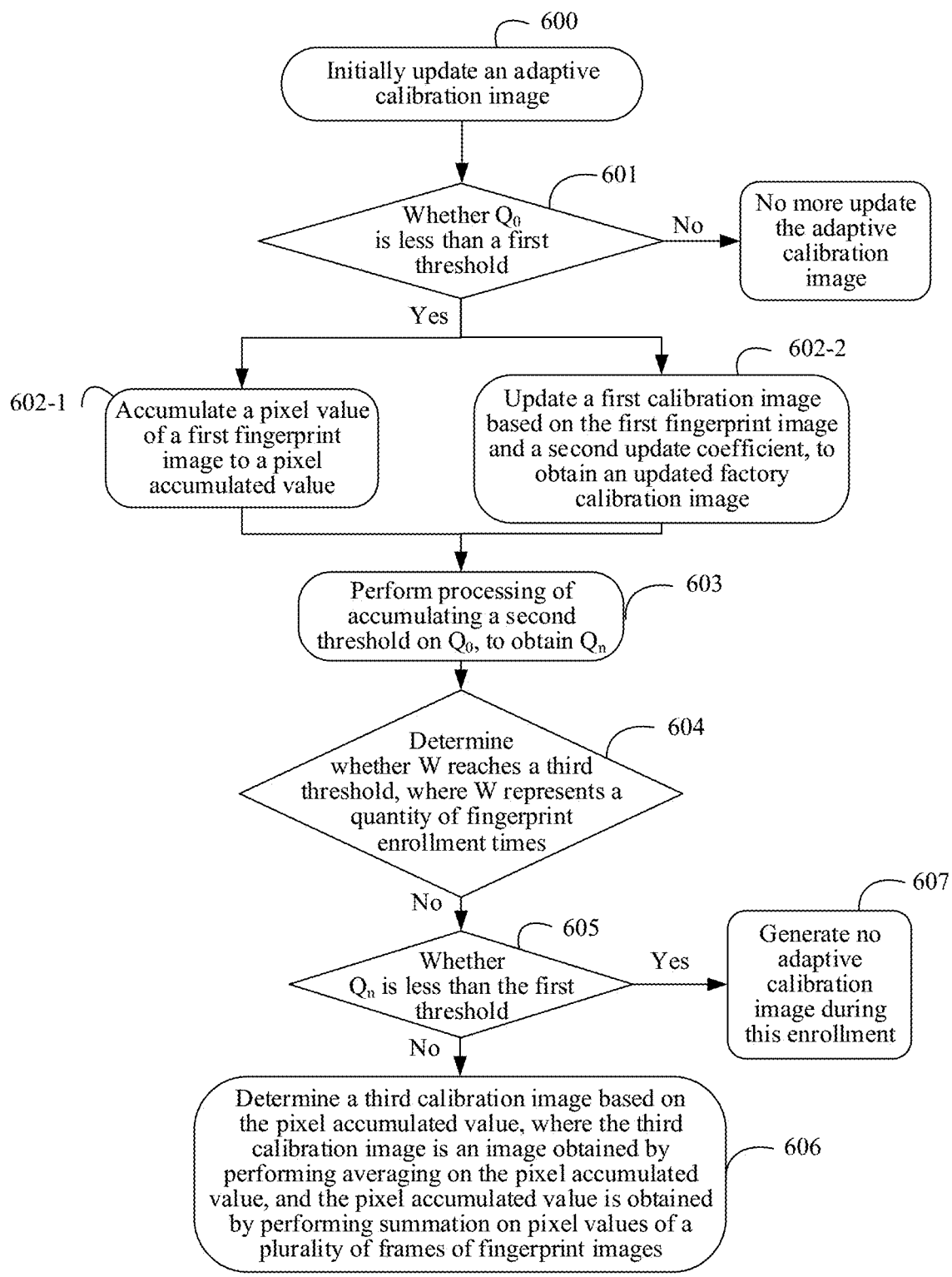
FIG. 6 is an example flowchart of generating a third calibration image according to an embodiment of this application.

The following describes an example procedure of generating the third calibration image with reference to FIG. 6. It should be understood that the method shown in FIG. 6 may be implemented in combination with the method in FIG. 5, or may be implemented independently. This is not specifically limited herein. For example, step 601 to step 607 shown in FIG. 6 may replace step 507 in FIG. 5. It should be further understood that for some terms or concepts in FIG. 6, refer to the foregoing descriptions in FIG. 5. For brevity, details are not described below again.

As shown in FIG. 6, the method includes the following steps.

Step 600: Initially update an adaptive calibration image.

Step 601: Determine (or determine) whether $Q_o$ is less than a first threshold, where $Q_o$ is used to represent an initial value of a first quantity. The first quantity is used to represent a quantity of update times of the adaptive calibration image.

If $Q_o$ is less than the first threshold, step 602-1 and step 602-2 are performed; or if $Q_o$ is not less than the first threshold, the adaptive calibration image is no longer updated.

For example, if no adaptive calibration image exists in an electronic device, when the adaptive calibration image is initially generated, a value of $Q_o$ is 0.

Step 602-1: If $Q_o$ is less than the first threshold, accumulate a pixel value of a first fingerprint image to a pixel accumulated value.

The foregoing pixel accumulated value represents a pixel sum of a plurality of frames of fingerprint images.

Step 602-2: If $Q_o$ is less than the first threshold, update a first calibration image based on the first fingerprint image and a second update coefficient, to obtain an updated factory calibration image.

Similarly, updating the first calibration image based on the first fingerprint image and the second update coefficient, to obtain the updated factory calibration image may also specifically include two manners, which are similar to Manner 1 and Manner 2 when the adaptive calibration image exists in the electronic device.

Optionally, in an embodiment, the factory calibration image may be updated according to the following formula:

$$\text{FactoryBase}(N) = \text{FactoryBase}(N-1)*(1-\lambda_4) + \text{Raw}(k)*\lambda_4$$

FactoryBase(N) represents the updated factory calibration image; FactoryBase(N−1) represents the first calibration image (or the factory calibration image); $\lambda_4$ represents the second update coefficient; and Raw(k) represents the pixel value of the first fingerprint image.

Alternatively, optionally, in an embodiment, the factory calibration image may be updated according to the following formula:

$$FactoryBase(N) =$$
$$FactoryBase(N-1)*(1-\lambda_4) + IFFT(Filter(FFT(Raw(k))))*\lambda_4$$

FactoryBase(N) represents the updated factory calibration image; FactoryBase(N−1) represents the first calibration image (or the factory calibration image); $\lambda_4$ represents the second update coefficient; Raw(k) represents the pixel value of the first fingerprint image; and FFT( ) represents fast Fourier transform processing, Filter( ) represents low-pass filtering processing, and IFFT( ) represents inverse fast Fourier transform processing.

Step 603: Perform processing of accumulating a second threshold on $Q_o$, to obtain $Q_n$, where $Q_n$ is used to represent an updated value of the first quantity.

For example, a value of the second threshold may be 1. In step 603, $Q_o$ is increased by 1, to obtain $Q_n$. After step 602-1 or step 602-2 is performed, $Q_o$ may be updated to obtain $Q_1$.

Step 604: Determine (or determine) whether W reaches a third threshold, where W represents a quantity of fingerprint enrollment times. W is an integer greater than or equal to 2.

After step 603, it may be determined whether the quantity of fingerprint enrollment times (represented by W) reaches a maximum upper limit. If W does not reach the upper limit, step 605 may be performed. If W has reached the upper limit, fingerprint enrollment stops.

The third threshold may be determined based on the upper limit of the fingerprint enrollment. For example, a maximum quantity of fingerprint enrollment times is 30. When a quantity of fingerprint enrollment times does not reach 30, step 605 may be performed.

Step 605: When W does not reach the third threshold, determine whether $Q_n$ is less than the first threshold.

When $Q_n$ is greater than or equal to the first threshold, step 606 is performed; or when $Q_n$ is less than the first threshold, step 607 is performed.

It should be understood that a value of the first threshold is not specifically limited in this embodiment of this application. A person skilled in the art may select a proper first threshold based on an actual requirement, to restrict a quantity of update times required for generating the adaptive calibration image.

Optionally, the first threshold may be determined based on a lower limit of the quantity of fingerprint enrollment times. For example, the first threshold is greater than or equal to the lower limit of the quantity of fingerprint enrollment times. In some extreme cases, when the quantity of fingerprint enrollment times reaches the lower limit, sufficient features of a same finger can be collected, and fingerprint pressing is not required. For example, if the lower limit of the quantity of fingerprint enrollment times is 10, the value of the first threshold is greater than or equal to 10. This has an advantage that when the quantity of fingerprint enrollment times reaches the lower limit, the adaptive calibration image can be updated.

Step 606: Determine the third calibration image based on the pixel accumulated value, where the third calibration image is an image obtained by performing averaging on the pixel accumulated value, and the pixel accumulated value is obtained by performing summation on pixel values of the plurality of frames of fingerprint images.

It should be noted that, when no adaptive calibration image exists in the electronic device, for a plurality of fingerprint enrollment times of a same finger, step 602-1 to step 603 may be performed if the calibration image is initially updated during each time of enrollment. In this way, in step 606, a quantity of adaptive update times is accumulated to a specific value, and the pixel accumulated value is also accumulated to a specific value.

For example, if $Q_n$ is finally accumulated to 15 times, 15 frames of images are obtained. Summation and averaging are performed on pixel values of the 15 frames of images to obtain an average value, and the obtained average value is used as a generated adaptive calibration image (for example, the third calibration image).

For example, when $Q_n$ is greater than or equal to the first threshold, the generated adaptive calibration image satisfies the following formula:

$$AdaptiveBase = \frac{SUM(AdaptiveBase)}{Q_n}$$

SUM(AdaptiveBase) represents the pixel accumulated value of the plurality of frames of fingerprint images. AdaptiveBase represents the generated adaptive calibration image (or the third calibration image).

Step 607: Generate no adaptive calibration image during this enrollment. Optionally, the updated factory calibration image in step 602-2 may be used as the third calibration image.

It should be understood that the procedure shown in FIG. 6 is merely an example for description, and this embodiment of this application is not limited thereto.

Based on the method procedure shown in FIG. 6, in the fingerprint enrollment procedure, a solution is provided for that no adaptive calibration image exists in the electronic device.

This application further provides an update procedure of the calibration image in the fingerprint verification procedure. Detailed descriptions are provided below. It should be understood that the fingerprint enrollment procedure and the fingerprint verification procedure may be used in combination, or may be independently implemented. This is not specifically limited in this embodiment of this application. It should be further understood that, for some terms or concepts in FIG. 7, refer to descriptions in FIG. 5. For brevity, meanings of terms or concepts that are the same as those described above are not described in the following.

Figure 7:
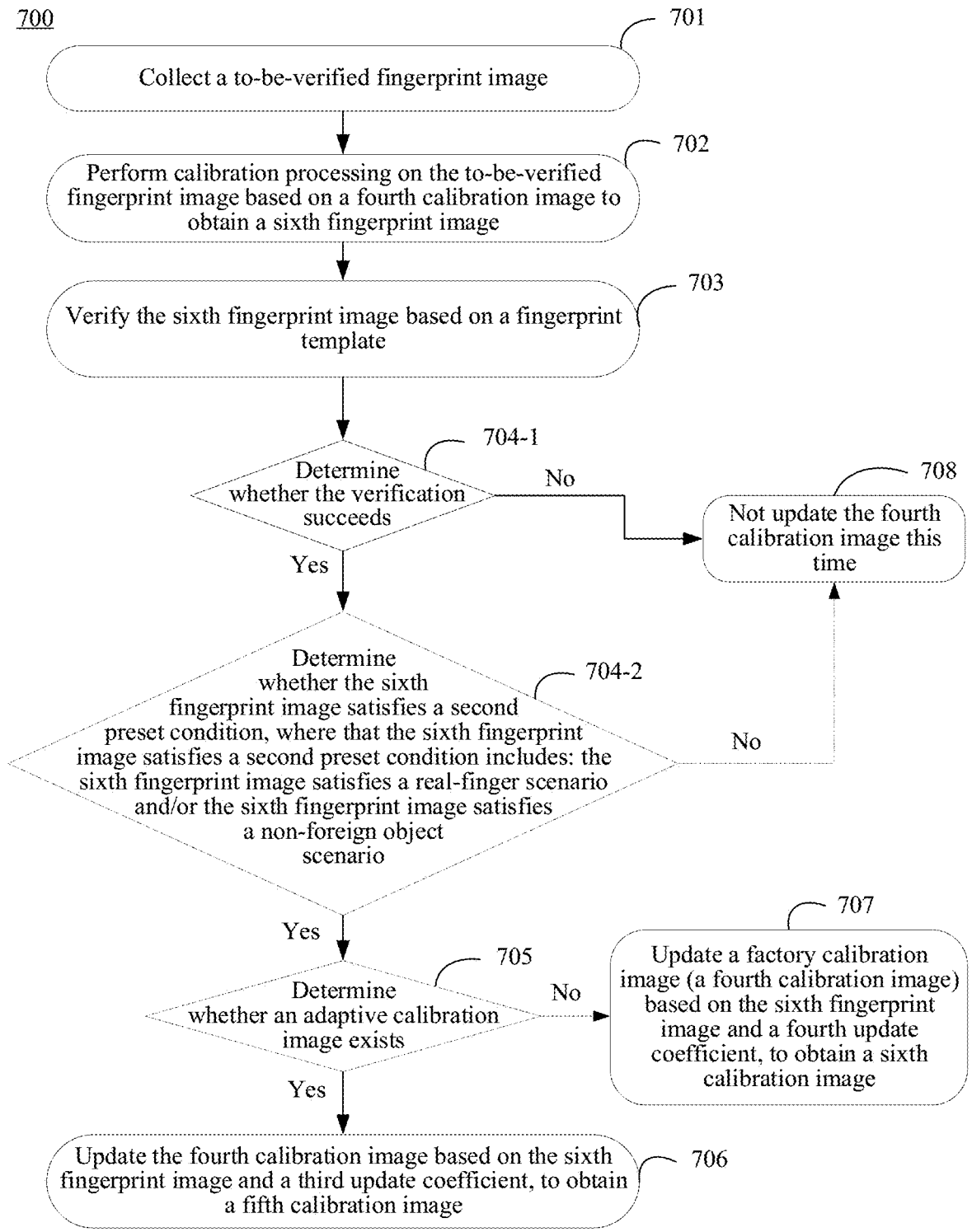
FIG. 7 is a schematic flowchart of a fingerprint recognition method according to another embodiment of this application.

FIG. 7 is a schematic flowchart of a fingerprint verification procedure according to an embodiment of this application. It should be understood that the method 700 shown in FIG. 7 may be implemented in combination with the method 500 in FIG. 5, or may be implemented independently. This is not specifically limited herein.

As shown in FIG. 7, the method 700 includes the following steps.

Step 701: Collect a to-be-verified fingerprint image.

For example, when performing fingerprint verification, a user may implement a fingerprint feature verification process by pressing a fingerprint unlocking area. A fingerprint module collects a feature of the to-be-verified fingerprint image based on pressing of the user, to prepare work for subsequent fingerprint verification. For example, in an optical fingerprint scenario, the user verifies a fingerprint by pressing the fingerprint unlocking area (for example, the fingerprint unlocking area 10 shown in (1) in FIG. 1).

The collected to-be-verified fingerprint image herein is an original RAW image, that is, original image data that is not processed through image processing.

Step 702: Perform calibration processing on the to-be-verified fingerprint image based on a fourth calibration image to obtain a sixth fingerprint image.

The fourth calibration image herein may be similar to the first calibration image in the enrollment procedure, that is, the first calibration image mentioned in the foregoing step 502.

Similarly, the fourth calibration image may be an adaptive calibration image, or may be a factory calibration image. If the first calibration image is the adaptive calibration image, calibration processing is performed on the to-be-enrolled fingerprint image based on the adaptive calibration image. If the first calibration image is the factory calibration image, calibration processing is performed on the to-be-enrolled fingerprint image based on the factory calibration image.

For related descriptions of calibration processing, refer to the foregoing description. Details are not described herein again. For example, performing the calibration processing on the to-be-verified fingerprint image based on the fourth calibration image includes the following steps: step (1): perform pixel subtraction on the RAW image of the to-be-verified fingerprint image and the fourth calibration image, and perform normalization processing on an obtained result; and step (2): perform median filtering processing on a normalization result obtained in step (1), so that pixels of the fingerprint image are at a same brightness level. After processing in step (1) and step (2), the sixth fingerprint image may be obtained. Whether the sixth fingerprint image can be used in the update procedure of the calibration image further depends on a subsequent determining factor.

Step 703: Verify (or match) the sixth fingerprint image based on a fingerprint template.

The fingerprint template may be a fingerprint template stored in a fingerprint template library. The fingerprint template library may include a plurality of fingerprint templates. During verification, the plurality of fingerprint templates may be sequentially matched until the matching succeeds or fails.

Optionally, before the sixth fingerprint image is verified, preprocessing may be performed on the sixth fingerprint image, and verification is performed based on a preprocessed fingerprint image.

It should be understood that a present fingerprint verification algorithm may be used for verifying the sixth fingerprint image. The fingerprint verification algorithm is not specifically limited in this embodiment of this application.

Step 704-1: Determine whether the sixth fingerprint image is successfully verified (or the matching succeeds). After the sixth fingerprint image is successfully verified, step 704-2 or step 705 may be performed; or after the sixth fingerprint image fails to be verified, step 708 is performed, that is, the fourth calibration image is not updated this time.

Optionally, in step 704-2, after the sixth fingerprint image is successfully verified, whether the sixth fingerprint image satisfies a second preset condition is determined, where that the sixth fingerprint image satisfies a second preset condition includes: the sixth fingerprint image satisfies a real-finger scenario and/or the sixth fingerprint image satisfies a non-foreign object scenario. If the sixth fingerprint image does not satisfy the second preset condition, step 708 is performed; or if the sixth fingerprint image satisfies the second preset condition, step 705 is performed.

For a detection algorithm in the real-finger scenario and the non-foreign object scenario, refer to the foregoing description in step 503-1. For brevity, details are not described herein again.

Optionally, it is determined, according to an anti-counterfeit detection algorithm or another real/fake finger detection algorithm, that the sixth fingerprint image satisfies the real-finger scenario. In the fingerprint verification procedure, this can avoid updating, to the adaptive calibration image, a fingerprint image collected by using a fake finger or a fingerprint image collected in a foreign object scenario.

Optionally, it is recognized, according to a foreign object detection algorithm, that the sixth fingerprint image satisfies the non-foreign object scenario. In the fingerprint verification procedure, this can avoid updating the fingerprint image collected in the foreign object scenario to the adaptive calibration image.

Step 705: After the sixth fingerprint image is successfully verified in step 704-1 or the sixth fingerprint image satisfies the second preset condition in step 704-2, determine whether the adaptive calibration image exists in the electronic device. When the adaptive calibration image exists in the electronic device, step 706 is performed; or when no adaptive calibration image exists in the electronic device, step 707 is performed.

In an implementation, after the sixth fingerprint image is successfully verified, it may be further determined whether the adaptive calibration image exists in the electronic device. In this way, the calibration image is updated only after the sixth fingerprint image is successfully verified, so that accuracy of the calibration image can be improved.

In another implementation, when the sixth fingerprint image is successfully verified, and the sixth fingerprint image satisfies the second preset condition, it is further determined whether the adaptive calibration image exists in the electronic device. In this way, the calibration image is updated only after the sixth fingerprint image is successfully verified. This helps avoid updating, to the adaptive calibration image, a fingerprint image collected by using a fake finger or a fingerprint image collected in a foreign object scenario.

Step 706: Update the fourth calibration image based on the sixth fingerprint image and a third update coefficient when the adaptive calibration image exists in the electronic device, to obtain a fifth calibration image, where the fourth calibration image is the adaptive calibration image.

The fifth calibration image may be understood as an updated adaptive calibration image. After the fifth calibration image is obtained, calibration processing is performed on a subsequently collected fingerprint image based on the fifth calibration image. A related process of calibration processing is similar to the foregoing process of performing calibration processing based on the second calibration image. This embodiment of this application provides two manners for calculating the fifth calibration image, and details are described below.

Step 707: Update a factory calibration image based on the sixth fingerprint image and a fourth update coefficient when no adaptive calibration image exists in the electronic device, to obtain a sixth calibration image, where the sixth calibration image is an updated factory calibration image, and the fourth calibration image is the factory calibration image.

The sixth calibration image may be understood as a calibration image obtained after the initial factory calibration image is updated. In other words, when no adaptive calibration image exists in the electronic device, the factory calibration image is updated.

Step 708: Not update the fourth calibration image this time.

In this embodiment of this application, in a fingerprint verification process, calibration processing is performed on the to-be-verified fingerprint image to determine whether the verification succeeds. If the verification succeeds, whether the adaptive calibration image exists continues to be determined. If the adaptive calibration image exists, the adaptive calibration image is adaptively updated based on the fingerprint image that passes the verification this time. If no adaptive calibration image exists, the factory calibration image may be updated based on the fingerprint image that passes the verification this time, so that the electronic device always stores a latest updated calibration image. This helps improve a fingerprint unlocking rate and a fingerprint unlocking speed, thereby improving fingerprint recognition experience (for example, unlocking experience) of a user.

In the fingerprint verification procedure, if it is determined that the adaptive calibration image (for example, the fourth calibration image) exists in the electronic device, the adaptive calibration image may be adaptively updated in the following two manners.

Manner 1

Optionally, in an embodiment, for step 706, updating the fourth calibration image based on the sixth fingerprint image and the third update coefficient, to obtain the fifth calibration image includes:
sequentially performing the following processing on the sixth fingerprint image: fast Fourier transform processing, low-pass filtering processing, and inverse fast Fourier transform processing, and updating the fourth calibration image based on the obtained fingerprint image and the third update coefficient, to obtain the fifth calibration image.

For related descriptions of the fast Fourier transform processing, the low-pass filtering processing, and the inverse fast Fourier transform processing, refer to the foregoing descriptions. For brevity, details are not described herein again.

According to the foregoing processing procedure, noise of the fingerprint image can be avoided to be updated to the adaptive calibration image, thereby helping improve accuracy and quality of the adaptive calibration image.

For example, the fifth calibration image satisfies the following formula:

$$Y_{adaptive}(N) = Y_{adaptive}(N-1) * (1-\lambda_4) + IFFT(\text{Filter}(FFT(\text{Raw}(s)))) * \lambda_4$$

$Y_{adaptive}(N)$ represents the fifth calibration image; $Y_{adaptive}(N-1)$ represents the fourth calibration image; $\lambda_4$ represents the third update coefficient; and FFT( ) represents fast Fourier transform processing, Filter( ) represents low-pass filtering processing, IFFT( ) represents inverse fast Fourier transform processing, and Raw(s) represents a pixel value of the sixth fingerprint image.

In Manner 1, when the adaptive calibration image is updated based on the sixth fingerprint image, image processing may be performed on the sixth fingerprint image in advance, to avoid updating interference noise of the sixth fingerprint image to the adaptive calibration image, thereby helping improve accuracy and quality of the adaptive calibration image.

It should be understood that the foregoing shows only a part of the processing process of the sixth fingerprint image. This embodiment of this application is not limited thereto. Actually, a person skilled in the art may properly add, based on the foregoing processing procedure, another processing procedure for improving image quality of the sixth fingerprint image, which falls within the protection scope of this embodiment of this application.

Manner 2

Optionally, in an embodiment, for step 706, updating the fourth calibration image based on the sixth fingerprint image and the third update coefficient, to obtain the fifth calibration image includes:
updating the fourth calibration image according to the following formula:

$$Y_{adaptive}(N) = Y_{adaptive}(N-1) * (1-\lambda_4) + \text{Raw}(s) * \lambda_4$$

$Y_{adaptive}(N)$ represents the fifth calibration image; $Y_{adaptive}(N-1)$ represents the fourth calibration image; $\lambda_4$ represents the third update coefficient; and Raw(s) represents a pixel value of the sixth fingerprint image.

In Manner 2, iterative update of the adaptive calibration image may be implemented, so that the adaptive calibration image can be better applied to a fingerprint recognition scenario, thereby better satisfying a personal application scenario of the user.

In the fingerprint verification procedure, if it is determined that no adaptive calibration image exists in the electronic device, the factory calibration image may be adaptively updated in the following two manners. In this case, the fourth calibration image indicates the factory calibration image.

Manner 1

Optionally, in an embodiment, in step 707, updating the factory calibration image based on the sixth fingerprint image and the fourth update coefficient, to obtain the sixth calibration image includes:
sequentially performing the following processing on the sixth fingerprint image: fast Fourier transform processing, low-pass filtering processing, and inverse fast Fourier transform processing, and updating the fourth calibration image based on the obtained fingerprint image and the third update coefficient, to obtain the sixth calibration image.

For example, the sixth calibration image satisfies the following formula:

$$Y_{update\ factory} = Y_{initial\ factory} * (1-\lambda_4) + IFFT(\text{Filter}(FFT(\text{Raw}(s)))) * \lambda_4$$

$Y_{update\ factory}$ represents the sixth calibration image; $Y_{initial\ factory}$ represents the fourth calibration image; $\lambda_4$ represents the fourth update coefficient; and FFT( ) represents fast Fourier transform processing, Filter( ) represents low-pass filtering processing, IFFT( ) represents inverse fast Fourier transform processing, and Raw(s) represents a pixel value of the sixth fingerprint image.

For related descriptions of the fast Fourier transform processing, the low-pass filtering processing, and the inverse fast Fourier transform processing, refer to the foregoing descriptions. For brevity, details are not described herein again.

According to the foregoing processing procedure, noise of the fingerprint image can be avoided to be updated to the adaptive calibration image, thereby helping improve accuracy and quality of the adaptive calibration image.

In Manner 1, when the factory calibration image is updated based on the sixth fingerprint image, image processing may be performed on the sixth fingerprint image in advance, to avoid updating interference noise of the sixth fingerprint image to an updated factory calibration image, thereby helping improve accuracy and quality of the updated factory calibration image.

It should be understood that the foregoing shows only a part of the processing process of the sixth fingerprint image. This embodiment of this application is not limited thereto. Actually, a person skilled in the art may properly add, based on the foregoing processing procedure, another processing procedure for improving image quality of the sixth fingerprint image, which falls within the protection scope of this embodiment of this application.

Manner 2

Optionally, in an embodiment, in step 707, updating the factory calibration image based on the sixth fingerprint image and the fourth update coefficient, to obtain the sixth calibration image includes:

$$Y_{update\ factory}(N) = Y_{initial\ factory}(N-1) * (1-\lambda_4) + Raw(s) * \lambda_4$$

$Y_{update\ factory}$ represents the sixth calibration image; $Y_{initial\ factory}$ represents the fourth calibration image; $\lambda_4$ represents the fourth update coefficient; and Raw(s) represents a pixel value of the sixth fingerprint image.

In Manner 2, iterative update of the factory calibration image may be implemented, so that an updated factory calibration image can be better applied to a fingerprint recognition scenario, thereby better satisfying a personal application scenario of the user.

It should be understood that the procedures shown in FIG. 5 to FIG. 7 are merely for ease of understanding, and this embodiment of this application is not limited thereto.

The fingerprint recognition method described above may be considered as a fingerprint calibration image update function in this embodiment of this application. The fingerprint calibration image update function in this embodiment of this application may be fixed in a terminal, and does not need to be manually enabled by a user. Alternatively, an option may be provided for the user to manually enable or disable the fingerprint calibration image update function. Optionally, this embodiment of this application further provides a switch option of the fingerprint calibration image update function for the user to select to enable or disable the fingerprint calibration image update function.

Optionally, the method 500 or the method 700 further includes: displaying a first interface, where the first interface includes a first option, and the first option is used to select to enable or disable a fingerprint calibration image update function.

The first interface is a fingerprint settings interface. It may be understood that, how to enter the first interface is not specifically limited in this embodiment of this application. For example, the fingerprint settings interface may be entered by setting an application. For another example, the fingerprint settings interface may also be entered by using a fingerprint-related application.

For example, a switch option (corresponding to the first option) for updating the fingerprint calibration image may be added on the fingerprint settings interface.

Figure 8:
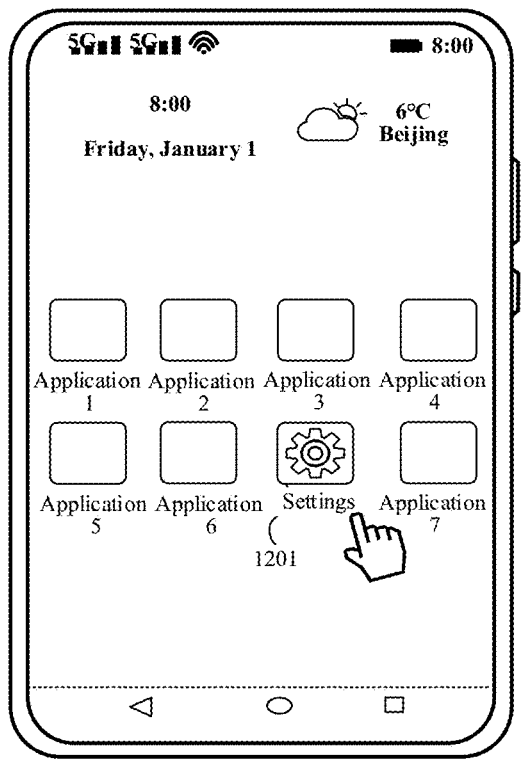
FIG. 8 is an example diagram of an interface according to an embodiment of this application.
Figure 8:
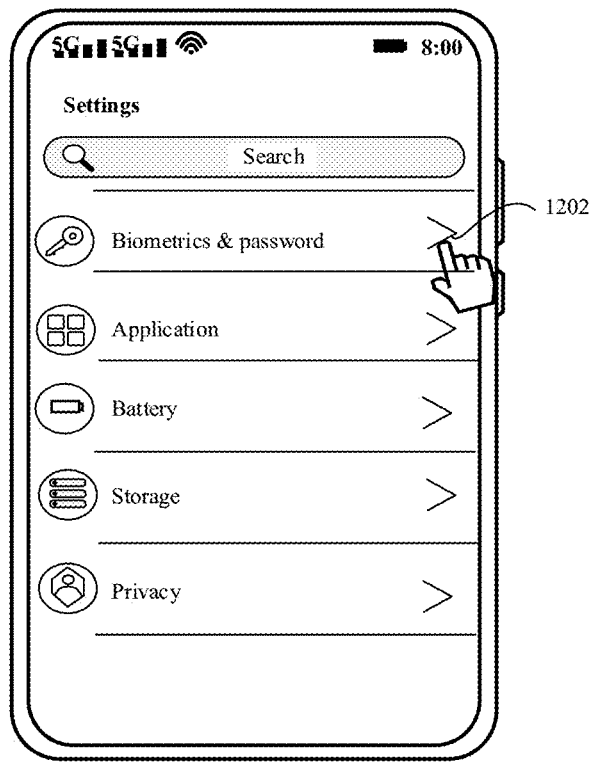
Figure 8:
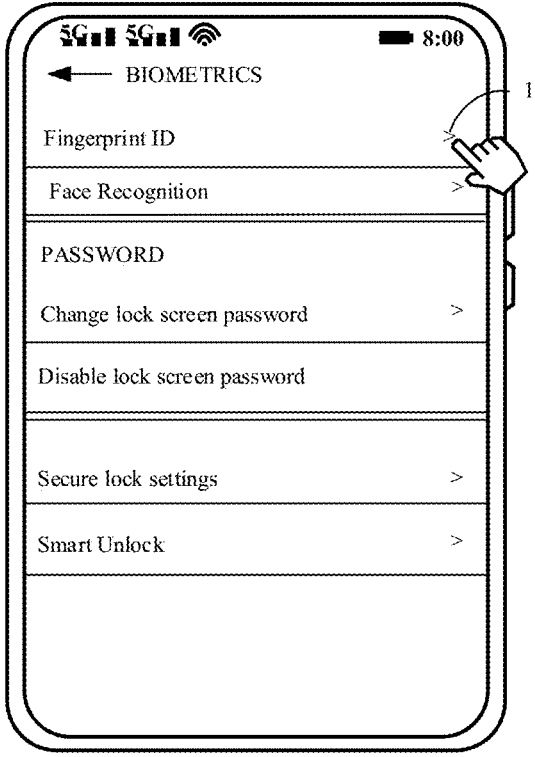
Figure 8:
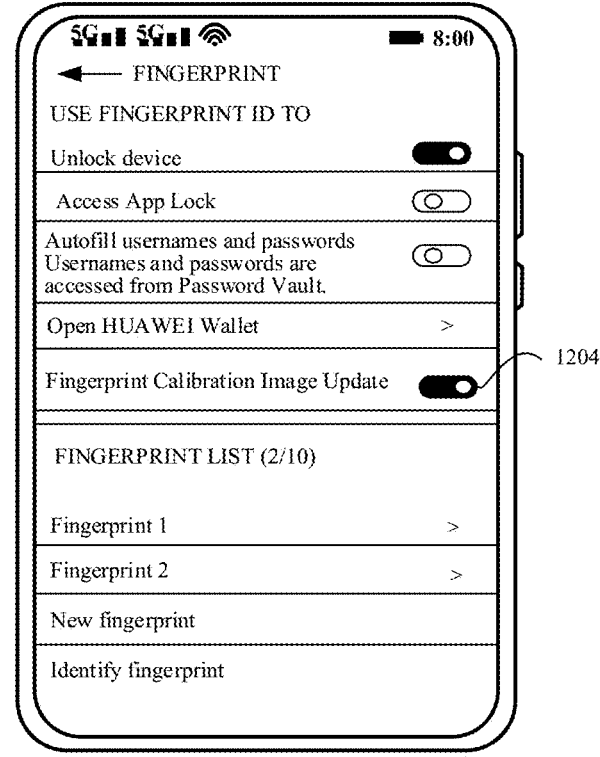

FIG. 8 is an example diagram of an interface according to an embodiment of this application. As shown in (1) in FIG. 8, a user taps settings 1201 to enter a settings interface, for example, an interface shown in (2) in FIG. 8. It may be understood that an interface shown in (1) in FIG. 8 may further include icons of other applications, for example, an application 1 to an application 7.

As shown in (2) in FIG. 8, the interface includes a biometrics & password control 1202. It may be understood that the interface shown in (2) in FIG. 8 may further include another setting function, for example, application settings, battery settings, storage settings, and privacy settings shown in (2) in FIG. 8.

It should be understood that setting options shown in (2) in FIG. 8 are merely examples of some setting functions, and this embodiment of this application is not limited thereto. It should be further understood that in (2) in FIG. 8 further shows a search settings bar, and the user may quickly search for function settings in the search settings bar.

When the user taps the biometrics & password control 1202, an interface shown in (3) in FIG. 8 is entered. As shown in (3) in FIG. 8, the interface includes a fingerprint settings control 1203.

Optionally, in addition to the fingerprint settings control 1203, (3) in FIG. 8 may further include a facial recognition settings control, a management control of a lock screen password (including change the lock screen password and disable the lock screen password), a secure lock settings control, and a smart unlock control. It should be understood that biometrics & password options shown in (3) in FIG. 8 are merely examples for description, and this embodiment of this application is not limited thereto.

After the user taps the fingerprint settings control 1203, an interface shown in (4) in FIG. 8 is entered. As shown in (4) in FIG. 8, the interface includes a fingerprint calibration image update option 1204. The user may tap the fingerprint calibration image update option 1204, to enable or disable a fingerprint calibration image update function. For example, the fingerprint calibration image update option 1204 shown in (4) in FIG. 8 is in an enabled state.

Optionally, in addition to the fingerprint calibration image update option 1204, (4) in FIG. 8 may further include another fingerprint management control. For example, (4) in FIG. 8 shows fingerprint usage options, including an option that a fingerprint is used to unlock a device, an option that a fingerprint is used to access an application lock, an option that a fingerprint is used to automatically fill a username and a password, and an option that a fingerprint is used for quick wallet payment. For another example, (4) in FIG. 8 shows fingerprint list management options, including a management control of a fingerprint 1, a management control of a fingerprint 2, a new fingerprint option, and a fingerprint recognition option.

It should be understood that, the application scenario in FIG. 8 is only for ease of understanding by a person skilled in the art, and is not intended to limit embodiments of this application to a specific scenario in the example.

With reference to FIG. 1 to FIG. 8, the foregoing describes in detail the fingerprint recognition method provided in embodiments of this application. The following describes in detail an apparatus embodiment of this application with reference to FIG. 9. It should be understood that a fingerprint recognition apparatus in embodiments of this application may perform various fingerprint recognition methods in the foregoing embodiments of this application. To be specific, for specific working processes of the following various products, refer to corresponding processes in the foregoing method embodiments.

Figure 9:
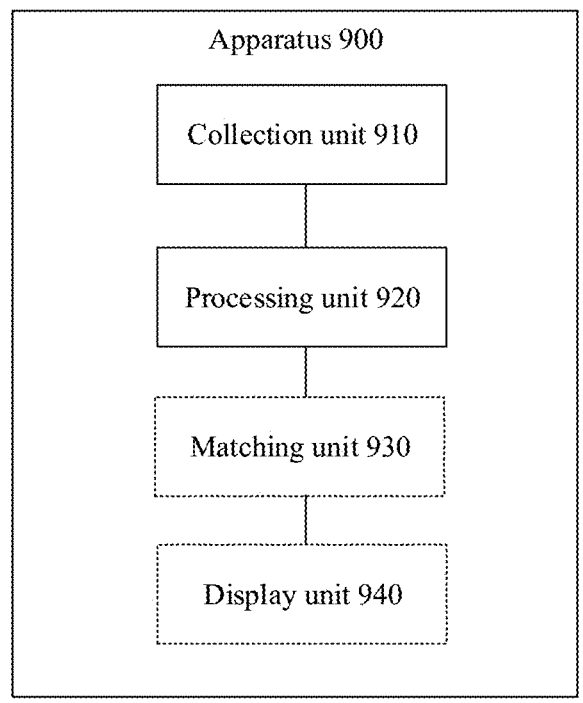
FIG. 9 is a schematic block diagram of a fingerprint recognition apparatus according to an embodiment of this application.

FIG. 9 is a schematic block diagram of a fingerprint recognition apparatus 900 according to an embodiment of this application. It should be understood that the apparatus 900 may perform the fingerprint recognition method shown in FIG. 4 to FIG. 8.

As shown in FIG. 9, the fingerprint recognition apparatus 900 includes a collection unit 910 and a processing unit 920. Optionally, the apparatus 900 further includes a matching unit 930. Optionally, the apparatus 900 further includes a display unit 940. In a possible example, the apparatus 900 may be a terminal device.

In an example, the collection unit 910 is configured to collect a to-be-enrolled fingerprint image.

The processing unit 920 is configured to perform, based on a first calibration image, calibration processing on the to-be-enrolled fingerprint image to obtain a first fingerprint image.

The processing unit 920 is further configured to determine whether an adaptive calibration image exists in an electronic device.

The processing unit 920 is further configured to update the first calibration image based on the first fingerprint image and a first update coefficient when the adaptive calibration image exists in the apparatus 900, to obtain a second calibration image, where the first calibration image is the adaptive calibration image, and the second calibration image is used to perform calibration processing on the collected fingerprint image.

The processing unit 920 is further configured to generate a third calibration image based on the first fingerprint image when no adaptive calibration image exists in the apparatus 900, where the third calibration image is used to perform calibration processing on the collected fingerprint image, the third calibration image is an image obtained by performing summation and averaging on a plurality of frames of fingerprint images, and the plurality of frames of fingerprint images include the first fingerprint image, or the third calibration image is an image obtained by updating the first calibration image based on the first fingerprint image.

Optionally, in an embodiment, the processing unit 920 is further configured to: before determining whether the adaptive calibration image exists in the electronic device, determine whether an overlapping area between the first fingerprint image and a second fingerprint image is less than a first area threshold, where the second fingerprint image is an enrolled fingerprint image; and
when the overlapping area between the first fingerprint image and the second fingerprint image is less than the first threshold, determine whether the adaptive calibration image exists in the apparatus 900.

Optionally, in an embodiment, the processing unit 920 is further configured to: before determining whether the overlapping area between the first fingerprint image and the second fingerprint image is less than the first area threshold, determine whether the first fingerprint image satisfies a first preset condition, where that the first fingerprint image satisfies a first preset condition includes: the first fingerprint image satisfies a real-finger scenario and/or the first fingerprint image satisfies a non-foreign object scenario; and
when the first fingerprint image satisfies the first preset condition, determine whether the overlapping area between the first fingerprint image and the second fingerprint image is less than the first area threshold.

Optionally, in an embodiment, the processing unit 920 is further configured to: when the adaptive calibration image exists in the electronic device, determine whether M frames of fingerprint images are currently accumulatively collected, where the M frames of fingerprint images include the first fingerprint image, the first fingerprint image is a last frame of image in the M frames of fingerprint images;
when the M frames of fingerprint images fail to be collected, skip updating the first calibration image; and
when the M frames of fingerprint images are collected, adaptively update the first calibration image based on the M frames of fingerprint images and the first update coefficient.

Optionally, in an embodiment, that the processing unit 920 is configured to update the first calibration image based on the M frames of fingerprint images specifically includes:
updating the first calibration image according to the following formula:

$$Y_1(N) = Y_1(N-1) * (1 - \lambda_1) + \frac{\sum_{k=1}^{M} \text{Raw}(k)}{M} * \lambda_1$$

$Y_1(N)$ represents the second calibration image; $Y_1(N-1)$ represents the first calibration image; $\lambda_1$ represents the first update coefficient; and $$\frac{\sum_{k=1}^{M} \text{Raw}(k)}{M}$$

represents a value obtained after summation and averaging are performed on pixel values of the M frames of fingerprint images.

Optionally, in an embodiment, that the processing unit 920 is configured to update the first calibration image based on the first fingerprint image and a first update coefficient when the adaptive calibration image exists in the electronic device includes:
performing fast Fourier transform processing on the first fingerprint image to obtain a third fingerprint image;
performing low-pass filtering processing on the third fingerprint image to obtain a fourth fingerprint image;
performing inverse fast Fourier transform processing on the fourth fingerprint image to obtain a fifth fingerprint image; and
updating the first calibration image based on the fifth fingerprint image and the first quantity of update times, to obtain the second calibration image.

Optionally, in an embodiment, the second calibration image satisfies the following formula:

$$Y_2(N) = Y_2(N-1) * (1 - \lambda_2) + IFFT(\text{Filter}(FFT(\text{Raw}(k)))) * \lambda_2$$

$Y_2$ represents the second calibration image; $Y_2(N-1)$ represents the first calibration image; $\lambda_2$ represents the first update coefficient; and FFT( ) represents fast Fourier transform processing, Filter( ) represents low-pass filtering processing, and IFFT( ) represents inverse fast Fourier transform processing.

Optionally, in an embodiment, the second calibration image satisfies the following formula:

$$Y_3(N) = Y_3(N-1) * (1-\lambda_3) + \text{Raw}(k) * \lambda_3$$

$Y_3(N)$ represents the second calibration image; $Y_3(N-1)$ represents the first calibration image; $\lambda_3$ represents the first update coefficient; and Raw(k) represents a pixel value of the first fingerprint image.

Optionally, in an embodiment, when the third calibration image is the image obtained by performing summation and averaging on the plurality of frames of fingerprint images, a first quantity is greater than or equal to a first threshold, where the first quantity is used to represent a quantity of update times of the adaptive calibration image; or when the third calibration image is the image obtained by updating the first calibration image, the first quantity is less than the first threshold.

Optionally, in an embodiment, that the processing unit 920 is configured to generate a third calibration image based on the first fingerprint image specifically includes:

determining whether $Q_o$ is less than the first threshold, where $Q_o$ is used to represent an initial value of the first quantity;

if $Q_o$ is less than the first threshold, updating the first calibration image based on the first fingerprint image and a second update coefficient, to obtain an updated factory calibration image;

accumulating the pixel value of the first fingerprint image to a pixel accumulated value;

performing processing of accumulating a second threshold on $Q_o$, to obtain $Q_n$, where $Q_n$ is used to represent an updated value of the first quantity;

determining whether W reaches a third threshold, where W represents a quantity of fingerprint collection times; and when W does not reach the third threshold, determining whether $Q_n$ is less than the first threshold; or when $Q_n$ is greater than or equal to the first threshold, determining the third calibration image based on the pixel accumulated value, where the third calibration image is an image obtained by performing averaging on the pixel accumulated value, and the pixel accumulated value is obtained by performing summation on pixel values of the plurality of frames of fingerprint images; or when $Q_n$ is less than the first threshold, using the updated factory calibration image as the third calibration image.

Optionally, in an embodiment, the display unit 940 is configured to display a first interface, where the first interface includes a first option, and the first option is used to select to enable or disable a fingerprint calibration image update function.

In another example, the collection unit 910 is configured to collect a to-be-verified fingerprint image.

The processing unit 920 is configured to perform calibration processing on the to-be-verified fingerprint image based on a fourth calibration image to obtain a sixth fingerprint image.

The matching unit 930 is configured to verify the sixth fingerprint image based on a fingerprint template.

The processing unit 920 is further configured to determine whether the sixth fingerprint image is successfully verified.

The processing unit 920 is further configured to: after the sixth fingerprint image is successfully verified, determine whether an adaptive calibration image exists in the apparatus 900.

The processing unit 920 is further configured to update the fourth calibration image based on the sixth fingerprint image and a third update coefficient when the adaptive calibration image exists in the apparatus 900, to obtain a fifth calibration image, where the fourth calibration image is the adaptive calibration image.

The processing unit 920 is further configured to update a factory calibration image based on the sixth fingerprint image and a fourth update coefficient when no adaptive calibration image exists in the apparatus 900, to obtain a sixth calibration image, where the sixth calibration image is an updated factory calibration image, and the fourth calibration image is the factory calibration image.

Optionally, in an embodiment, the processing unit 920 is further configured to: before determining whether the adaptive calibration image exists in the electronic device, determine whether the sixth fingerprint image satisfies a second preset condition, where that the sixth fingerprint image satisfies a second preset condition includes: the sixth fingerprint image satisfies a real-finger scenario and/or the sixth fingerprint image satisfies a non-foreign object scenario; and when the sixth fingerprint image satisfies the second preset condition, determine whether the adaptive calibration image exists in the apparatus 900.

Optionally, in an embodiment, the fifth calibration image satisfies the following formula:

$$Y_{adaptive}(N) =$$
$$Y_{adaptive}(N-1) * (1-\lambda_4) + IFFT(\text{Filter}(FFT(\text{Raw}(s)))) * \lambda_4;$$
or
$$Y_{adaptive}(N) = Y_{adaptive}(N-1) * (1-\lambda_4) + \text{Raw}(s) * \lambda_4$$

$Y_{adaptive}(N)$ represents the fifth calibration image; $Y_{adaptive}(N-1)$ represents the fourth calibration image; $\lambda_4$ represents the third update coefficient; and FFT( ) represents fast Fourier transform processing, Filter( ) represents low-pass filtering processing, IFFT( ) represents inverse fast Fourier transform processing, and Raw(s) represents a pixel value of the sixth fingerprint image.

Optionally, in an embodiment, the sixth calibration image satisfies the following formula:

$$Y_{update\ factory} = Y_{initial\ factory} * (1-\lambda_4) + IFFT(\text{Filter}(FFT(\text{Raw}(s)))) * \lambda_4;$$
or
$$Y_{update\ factory}(N) = Y_{initial\ factory}(N-1) * (1-\lambda_4) + \text{Raw}(s) * \lambda_4$$

$Y_{update\ factory}$ represents the sixth calibration image; $Y_{initial\ factory}$ represents the fourth calibration image; $\lambda_4$ represents the fourth update coefficient; and FFT( ) represents fast Fourier transform processing, Filter( ) represents low-pass filtering processing, IFFT( ) represents inverse fast Fourier transform processing, and Raw(s) represents a pixel value of the sixth fingerprint image.

Optionally, in an embodiment, the display unit 940 is configured to display a first interface, where the first interface includes a first option, and the first option is used to select to enable or disable a fingerprint calibration image update function.

In a possible example, the processing unit 920 and the matching unit 930 may be implemented via a processor or a processing unit. The display unit 940 may be implemented via a screen. It should be understood that the apparatus 900 is presented in a form of a functional unit. The term "unit" herein may be implemented in a form of software and/or hardware. This is not specifically limited in this embodiment of this application.

For example, the "unit" may be a software program, a hardware circuit, or a combination thereof that implements the foregoing function. The hardware circuit may include an application specific integrated circuit (application specific integrated circuit, ASIC), an electronic circuit, a processor that executes one or more software or firmware programs (for example, a shared processor, a dedicated processor, or a group processor) and a memory, an integrated logic circuit, and/or another suitable device that can provide the foregoing function. In a simple embodiment, a person skilled in the art can figure out that the apparatus 900 may use the form shown in FIG. 2.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

This application further provides a computer program product. When the computer program product is executed by the processor, the method according to any method embodiment of this application is implemented.

The computer program product may be stored in the memory. After being preprocessed, compiled, assembled, linked, and the like, the computer program product is finally converted into an executable target file that can be executed by the processor.

This application further provides a computer-readable storage medium. The computer-readable storage medium stores a computer program. When the computer program is executed by a computer, the method according to any method embodiment of this application is implemented. The computer program may be a high-level language program, or may be an executable target program.

The computer-readable storage medium may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objective of the solutions of embodiments.

In addition, functional units in embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory ROM, a random access memory RAM, a magnetic disk, or an optical disc.

It should be understood that sequence numbers of the processes do not mean an execution sequence in embodiments of this application. The execution sequence of the processes should be determined based on functions and internal logic of the processes, and should not be constituted as any limitation on the implementation processes of embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. For example, A/B may represent A or B.

The terms (or numbers) "first", "second", . . . , and the like in embodiments of this application are merely intended for a purpose of description, that is, are merely intended to distinguish between different objects, for example, different "fingerprint images", and cannot be understood as an indication or implication of relative importance or implicit indication of a quantity of indicated technical features. Therefore, a feature limited by "first", "second", or the like may explicitly or implicitly include one or more features. In the descriptions of embodiments of this application, "at least one (item)" means one or more. "A plurality of" means two or more. "At least one of the following pieces (items)" or a similar expression thereof refers to any combination of these items, including any combination of singular pieces (items) or plural pieces (items).

For example, unless otherwise specified, an expression used in embodiments of this application similar to an expression that "an item includes at least one of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and other combinations of A, B, and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

In conclusion, the foregoing descriptions are merely examples of embodiments of the technical solutions of this application, but are not intended to limit the protection scope of this application. Any modification, equivalent replacement, or improvement made without departing from the spirit and principle of this application shall fall within the protection scope of this application.

The invention claimed is:

1. A fingerprint recognition method, wherein the method is applied to an electronic device, and the method comprises:
collecting a to-be-enrolled fingerprint image;
performing, based on a first calibration image, calibration processing on the to-be-enrolled fingerprint image to obtain a first fingerprint image; and
determining whether an adaptive calibration image exists in the electronic device; and
updating the first calibration image based on the first fingerprint image and a first update coefficient when the adaptive calibration image exists in the electronic device, to obtain a second calibration image, wherein the first calibration image is the adaptive calibration image, and the second calibration image is used to perform calibration processing on the collected fingerprint image; or
generating a third calibration image based on the first fingerprint image when no adaptive calibration image exists in the electronic device, wherein the third calibration image is used to perform calibration processing on the collected fingerprint image, the third calibration image is an image obtained by performing summation and averaging on a plurality of frames of fingerprint images, and the plurality of frames of fingerprint images comprise the first fingerprint image, or the third calibration image is an image obtained by updating the first calibration image based on the first fingerprint image.

2. The method according to claim 1, wherein before the determining whether an adaptive calibration image exists in the electronic device, the method further comprises:
determining whether an overlapping area between the first fingerprint image and a second fingerprint image is less than a first area threshold, wherein the second fingerprint image is an enrolled fingerprint image; and
the determining whether an adaptive calibration image exists in the electronic device comprises:
when the overlapping area between the first fingerprint image and the second fingerprint image is less than the first area threshold, determining whether the adaptive calibration image exists in the electronic device.

3. The method according to claim 2, wherein before the determining whether an overlapping area between the first fingerprint image and a second fingerprint image is less than a first area threshold, the method further comprises:
determining whether the first fingerprint image satisfies a first preset condition, wherein that the first fingerprint image satisfies a first preset condition comprises: the first fingerprint image satisfies a real-finger scenario and/or the first fingerprint image satisfies a non-foreign object scenario; and
the determining whether an overlapping area between the first fingerprint image and a second fingerprint image is less than a first area threshold comprises:
when the first fingerprint image satisfies the first preset condition, determining whether the overlapping area between the first fingerprint image and the second fingerprint image is less than the first area threshold.

4. The method according to claim 1, wherein when the adaptive calibration image exists in the electronic device, the method further comprises:
determining whether M frames of fingerprint images are currently accumulatively collected, wherein the M frames of fingerprint images comprise the first fingerprint image, the first fingerprint image is a last frame of image in the M frames of fingerprint images, and M is an integer greater than or equal to 2;
when the M frames of fingerprint images fail to be collected, skipping updating the first calibration image; and
the adaptively updating the first calibration image based on the first fingerprint image and a first update coefficient comprises:

when the M frames of fingerprint images are collected, adaptively updating the first calibration image based on the M frames of fingerprint images and the first update coefficient.

5. The method according to claim 4, wherein the updating the first calibration image based on the M frames of fingerprint images comprises:

updating the first calibration image according to the following formula:

$$Y_1(N) = Y_1(N-1) * (1-\lambda_1) + \frac{\sum_{k=1}^{M} \text{Raw}(k)}{M} * \lambda_1,$$

wherein $Y_1(N)$ represents the second calibration image; $Y_1(N-1)$ represents the first calibration image; $\lambda_1$ represents the first update coefficient; and $$\frac{\sum_{k=1}^{M} \text{Raw}(k)}{M}$$

represents a value obtained after summation and averaging are performed on pixel values of the M frames of fingerprint images.

6. The method according to claim 1, wherein the updating the first calibration image based on the first fingerprint image and a first update coefficient when the adaptive calibration image exists in the electronic device comprises:

performing fast Fourier transform processing on the first fingerprint image to obtain a third fingerprint image;

performing low-pass filtering processing on the third fingerprint image to obtain a fourth fingerprint image;

performing inverse fast Fourier transform processing on the fourth fingerprint image to obtain a fifth fingerprint image; and updating the first calibration image based on the fifth fingerprint image and a first quantity of update times, to obtain the second calibration image.

7. The method according to claim 6, wherein the second calibration image satisfies the following formula:

$$Y_2(N) = Y_2(N-1) * (1-\lambda_2) + IFFT(\text{Filter}(FFT(\text{Raw}(k)))) * \lambda_2,$$

wherein $Y_2$ represents the second calibration image; $Y_2(N-1)$ represents the first calibration image; $\lambda_2$ represents the first update coefficient; and FFT( ) represents fast Fourier transform processing, Filter( ) represents low-pass filtering processing, and IFFT( ) represents inverse fast Fourier transform processing.

8. The method according to claim 1, wherein the second calibration image satisfies the following formula:

$$Y_3(N) = Y_3(N-1) * (1-\lambda_3) + \text{Raw}(k) * \lambda_3,$$

wherein $Y_3(N)$ represents the second calibration image; $Y_3(N-1)$ represents the first calibration image; $\lambda_3$ represents the first update coefficient; and Raw(k) represents a pixel value of the first fingerprint image.

9. The method according to claim 1, wherein when the third calibration image is the image obtained by performing summation and averaging on the plurality of frames of fingerprint images, a first quantity is greater than or equal to a first threshold, wherein the first quantity is used to represent a quantity of adaptive update times when generating the third calibration image; or when the third calibration image is the image obtained by updating the first calibration image, the first quantity is less than the first threshold.

10. The method according to claim 9, wherein the generating a third calibration image based on the first fingerprint image comprises:

determining whether $Q_o$ is less than the first threshold, wherein $Q_o$ is used to represent an initial value of the first quantity;

if $Q_o$ is less than the first threshold, updating the first calibration image based on the first fingerprint image and a second update coefficient, to obtain an updated factory calibration image;

accumulating the pixel value of the first fingerprint image to a pixel accumulated value;

performing processing of accumulating a second threshold on $Q_o$, to obtain $Q_n$, wherein $Q_n$ is used to represent an updated value of the first quantity;

determining whether W reaches a third threshold, wherein W represents a quantity of fingerprint collection times; and when W does not reach the third threshold, determining whether $Q_n$ is less than the first threshold; and when $Q_n$ is greater than or equal to the first threshold, determining the third calibration image based on the pixel accumulated value, wherein the third calibration image is an image obtained by performing averaging on the pixel accumulated value, and the pixel accumulated value is obtained by performing summation on pixel values of the plurality of frames of fingerprint images; or when $Q_n$ is less than the first threshold, using the updated factory calibration image as the third calibration image.

11. The method according to claim 1, wherein the method further comprises:

displaying a first interface, wherein the first interface comprises a first option, and the first option is used to select to enable or disable a fingerprint calibration image update function.

12. The method according to claim 3, wherein when the adaptive calibration image exists in the electronic device, the method further comprises:

determining whether M frames of fingerprint images are currently accumulatively collected, wherein the M frames of fingerprint images comprise the first fingerprint image, the first fingerprint image is a last frame of image in the M frames of fingerprint images, and M is an integer greater than or equal to 2;

when the M frames of fingerprint images fail to be collected, skipping updating the first calibration image; and the adaptively updating the first calibration image based on the first fingerprint image and a first update coefficient comprises:

when the M frames of fingerprint images are collected, adaptively updating the first calibration image based on the M frames of fingerprint images and the first update coefficient.

13. The method according to claim 3, wherein the updating the first calibration image based on the first fingerprint image and a first update coefficient when the adaptive calibration image exists in the electronic device comprises:
performing fast Fourier transform processing on the first fingerprint image to obtain a third fingerprint image;
performing low-pass filtering processing on the third fingerprint image to obtain a fourth fingerprint image;
performing inverse fast Fourier transform processing on the fourth fingerprint image to obtain a fifth fingerprint image; and
updating the first calibration image based on the fifth fingerprint image and a first quantity of update times, to obtain the second calibration image.

14. The method according to claim 8, wherein
when the third calibration image is the image obtained by performing summation and averaging on the plurality of frames of fingerprint images, a first quantity is greater than or equal to a first threshold, wherein the first quantity is used to represent a quantity of adaptive update times when generating the third calibration image; or
when the third calibration image is the image obtained by updating the first calibration image, the first quantity is less than the first threshold.

15. A fingerprint recognition method, wherein the method is applied to an electronic device, and the method comprises:
collecting a to-be-verified fingerprint image;
performing calibration processing on the to-be-verified fingerprint image based on a fourth calibration image to obtain a sixth fingerprint image;
verifying the sixth fingerprint image based on a fingerprint template;
determining whether the sixth fingerprint image is successfully verified;
after the sixth fingerprint image is successfully verified, determining whether an adaptive calibration image exists in the electronic device; and
updating the fourth calibration image based on the sixth fingerprint image and a third update coefficient when the adaptive calibration image exists in the electronic device, to obtain a fifth calibration image, wherein the fourth calibration image is the adaptive calibration image; or
updating a factory calibration image based on the sixth fingerprint image and a fourth update coefficient when no adaptive calibration image exists in the electronic device, to obtain a sixth calibration image, wherein the sixth calibration image is an updated factory calibration image, and the fourth calibration image is the factory calibration image.

16. The method according to claim 15, wherein before the determining whether an adaptive calibration image exists in the electronic device, the method further comprises:
determining whether the sixth fingerprint image satisfies a second preset condition, wherein that the sixth fingerprint image satisfies a second preset condition comprises: the sixth fingerprint image satisfies a real-finger scenario and/or the sixth fingerprint image satisfies a non-foreign object scenario; and
the determining whether an adaptive calibration image exists in the electronic device comprises:
when the sixth fingerprint image satisfies the second preset condition, determining whether the adaptive calibration image exists in the electronic device.

17. The method according to claim 15, wherein the fifth calibration image satisfies the following formula:

$$Y_{adaptive}(N) = Y_{adaptive}(N-1) * (1-\lambda_4) + IFFT(\text{Filter}(FFT(\text{Raw}(s)))) * \lambda_4;$$

or $$Y_{adaptive}(N) = Y_{adaptive}(N-1) * (1-\lambda_4) + \text{Raw}(s) * \lambda_4,$$

wherein
$Y_{adaptive}(N)$ adaptive represents the fifth calibration image; $Y_{adaptive}(N-1)$ represents the fourth calibration image; $\lambda_4$ represents the third update coefficient; and FFT( ) represents fast Fourier transform processing, Filter( ) represents low-pass filtering processing, IFFT( ) represents inverse fast Fourier transform processing, and Raw(s) represents a pixel value of the sixth fingerprint image.

18. The method according to claim 15, wherein the sixth calibration image satisfies the following formula:

$$Y_{update\ factory} = Y_{initial\ factory} * (1-\lambda_4) + IFFT(\text{Filter}(FFT(\text{Raw}(s)))) * \lambda_4;$$

or $$Y_{update\ factory}(N) = Y_{initial\ factory}(N-1) * (1-\lambda_4) + \text{Raw}(s) * \lambda_4,$$

wherein
$Y_{update\ factory}$ represents the sixth calibration image; $Y_{initial\ factory}$ represents the fourth calibration image; $\lambda_4$ represents the fourth update coefficient; and FFT( ) represents fast Fourier transform processing, Filter( ) represents low-pass filtering processing, IFFT( ) represents inverse fast Fourier transform processing, and Raw(s) represents a pixel value of the sixth fingerprint image.

19. An electronic device, comprising a processor and a memory, wherein the processor is coupled to the memory, the memory is configured to store a computer program, and when the computer program is executed by the processor, the electronic device is enabled to perform the method comprises:
collecting a to-be-enrolled fingerprint image;
performing, based on a first calibration image, calibration processing on the to-be-enrolled fingerprint image to obtain a first fingerprint image; and
determining whether an adaptive calibration image exists in the electronic device; and
updating the first calibration image based on the first fingerprint image and a first update coefficient when the adaptive calibration image exists in the electronic device, to obtain a second calibration image, wherein the first calibration image is the adaptive calibration image, and the second calibration image is used to perform calibration processing on the collected fingerprint image; or
generating a third calibration image based on the first fingerprint image when no adaptive calibration image exists in the electronic device, wherein the third calibration image is used to perform calibration processing on the collected fingerprint image, the third calibration image is an image obtained by performing summation and averaging on a plurality of frames of fingerprint images, and the plurality of frames of fingerprint images comprise the first fingerprint image, or the third calibration image is an image obtained by updating the first calibration image based on the first fingerprint image.

20. An electronic device, comprising a processor and a memory, wherein the processor is coupled to the memory, the memory is configured to store a computer program, and when the computer program is executed by the processor, the electronic device is enabled to perform the method according to claim 15.

* * * * *

UNITED STATES PATENT AND TRADEMARK OFFICE
CERTIFICATE OF CORRECTION

PATENT NO. : 12,444,227 B2
APPLICATION NO. : 18/837020
DATED : October 14, 2025
INVENTOR(S) : Di et al.

Page 1 of 1

It is certified that error appears in the above-identified patent and that said Letters Patent is hereby corrected as shown below:

In the Claims

In Column 44, in Claim 10, Line 20, delete "$Q_o$" and insert -- $Q_0$ --.

In Column 44, in Claim 10, Line 21, delete "$Q_o$" and insert -- $Q_0$ --.

In Column 44, in Claim 10, Line 23, delete "$Q_o$" and insert -- $Q_0$ --.

In Column 44, in Claim 10, Line 30, delete "$Q_o$," and insert -- $Q_0$, --.

In Column 46, in Claim 17, Line 17, after "$Y_{adaptive}(N)$" delete "adaptive".

Signed and Sealed this
Twenty-fifth Day of November, 2025

John A. Squires
*Director of the United States Patent and Trademark Office*